(12) United States Patent
Doumar et al.

(10) Patent No.: US 12,548,040 B2
(45) Date of Patent: *Feb. 10, 2026

(54) SYSTEM AND METHODS FOR AUTOMATED Wi-Fi SETUP ON INTEGRATED OPT-IN VIA TEXT REDIRECT

(71) Applicant: TapText llc, Coral Springs, FL (US)

(72) Inventors: Steve Doumar, Fort Lauderdale, FL (US); David Teodosio, Guilford, CT (US)

(73) Assignee: TAPTEXT LLC, Coral Springs, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/130,409

(22) Filed: Apr. 3, 2023

(65) Prior Publication Data
US 2023/0351427 A1  Nov. 2, 2023

Related U.S. Application Data

(63) Continuation-in-part of application No. 18/191,872, filed on Mar. 29, 2023, which is a
(Continued)

(51) Int. Cl.
*G06Q 30/0207*  (2023.01)
*G06F 16/955*  (2019.01)
(Continued)

(52) U.S. Cl.
CPC ..... *G06Q 30/0207* (2013.01); *G06F 16/9554* (2019.01); *G06F 16/9558* (2019.01);
(Continued)

(58) Field of Classification Search
CPC ......... G06Q 30/0207; G06Q 10/06315; G06Q 30/016; G06Q 30/0201; G06Q 30/0267;
(Continued)

(56) References Cited

U.S. PATENT DOCUMENTS 8,160,625 B1  4/2012  Boyle et al.
8,620,365 B2  12/2013  Hunziker
(Continued)

FOREIGN PATENT DOCUMENTS

EP  3316549 A1  5/2018

OTHER PUBLICATIONS

Wang et al. Non-fungible token (NFT): Overview, evaluation, opportunities and challenges. arXiv preprint arXiv:2105.07447.Oct. 25, 2021. [retrieved on Jul. 3, 2023] Retrieved from the Internet < URL: https://arxiv.org/pdf/2105.07447.pdf> entire document.

*Primary Examiner* — James N Fiorillo
(74) *Attorney, Agent, or Firm* — Galvin Patent Law LLC; Brian R. Galvin

(57) ABSTRACT

A system and method for automated wi-fi setup on a mobile device with text redirected opt-in. The first step is scanning a QR code with a user computing device, such as a mobile phone, that triggers a text message to auto-populate on the user computing device. The auto-populated message comprises a unique identifier. The second step is for the QR code to trigger the mobile device to connect to a network using encoded Wi-Fi network settings. Optionally, the system may integrate with a communications and interaction system.

14 Claims, 29 Drawing Sheets

Related U.S. Application Data continuation-in-part of application No. 18/161,086, filed on Jan. 29, 2023, which is a continuation-in-part of application No. 17/942,227, filed on Sep. 12, 2022, now Pat. No. 12,158,938, and a continuation-in-part of application No. 17/943,118, filed on Sep. 12, 2022, now Pat. No. 12,067,587, which is a continuation-in-part of application No. 17/875,402, filed on Jul. 27, 2022, now Pat. No. 11,861,640, said application No. 18/161,086 is a continuation-in-part of application No. 17/409,841, filed on Aug. 24, 2021, now Pat. No. 11,610,193, which is a continuation-in-part of application No. 17/360,731, filed on Jun. 28, 2021, now Pat. No. 11,871,308, said application No. 18/161,086 is a continuation-in-part of application No. 17/351,321, filed on Jun. 18, 2021, now Pat. No. 11,201,965, which is a continuation of application No. 17/349,659, filed on Jun. 16, 2021, now Pat. No. 11,488,188, said application No. 17/875,402 is a continuation of application No. 17/349,659, filed on Jun. 16, 2021, now Pat. No. 11,488,188, which is a continuation of application No. 17/348,660, filed on Jun. 15, 2021, now Pat. No. 11,232,471, which is a continuation of application No. 17/344,695, filed on Jun. 10, 2021, now Pat. No. 11,354,691, which is a continuation of application No. 17/229,251, filed on Apr. 13, 2021, now abandoned, said application No. 17/360,731 is a continuation-in-part of application No. 17/229,251, filed on Apr. 13, 2021, now abandoned, which is a continuation-in-part of application No. 17/209,474, filed on Mar. 23, 2021, now Pat. No. 11,599,916, which is a continuation-in-part of application No. 17/208,059, filed on Mar. 22, 2021, now Pat. No. 11,562,407, which is a continuation-in-part of application No. 17/191,977, filed on Mar. 4, 2021, now abandoned, which is a continuation-in-part of application No. 17/190,260, filed on Mar. 2, 2021, now Pat. No. 11,532,020, which is a continuation-in-part of application No. 17/153,426, filed on Jan. 20, 2021, now abandoned, said application No. 17/360,731 is a continuation-in-part of application No. 17/085,931, filed on Oct. 30, 2020, now Pat. No. 11,055,736, which is a continuation-in-part of application No. 16/693,275, filed on Nov. 23, 2019, now Pat. No. 11,270,354.

(60) Provisional application No. 63/411,876, filed on Sep. 30, 2022, provisional application No. 63/411,163, filed on Sep. 29, 2022, provisional application No. 63/350,415, filed on Jun. 9, 2022, provisional application No. 63/319,314, filed on Mar. 12, 2022, provisional application No. 63/211,496, filed on Jun. 16, 2021, provisional application No. 63/166,391, filed on Mar. 26, 2021, provisional application No. 63/154,357, filed on Feb. 26, 2021, provisional application No. 63/040,610, filed on Jun. 18, 2020, provisional application No. 63/025,287, filed on May 15, 2020, provisional application No. 63/022,190, filed on May 8, 2020, provisional application No. 62/994,219, filed on Mar. 24, 2020, provisional application No. 62/965,626, filed on Jan. 24, 2020, provisional application No. 62/963,568, filed on Jan. 21, 2020, provisional application No. 62/963,379, filed on Jan. 20, 2020, provisional application No. 62/963,368, filed on Jan. 20, 2020, provisional application No. 62/940,607, filed on Nov. 26, 2019, provisional application No. 62/904,568, filed on Sep. 23, 2019, provisional application No. 62/883,360, filed on Aug. 6, 2019, provisional application No. 62/879,862, filed on Jul. 29, 2019.

(51) Int. Cl.

| | | |
|---|---|---|
| *G06F 21/32* | (2013.01) | |
| *G06F 21/62* | (2013.01) | |
| *G06K 7/14* | (2006.01) | |
| *G06K 19/06* | (2006.01) | |
| *G06N 20/00* | (2019.01) | |
| *G06Q 10/0631* | (2023.01) | |
| *G06Q 30/016* | (2023.01) | |
| *G06Q 30/0201* | (2023.01) | |
| *G06Q 30/0251* | (2023.01) | |
| *H04M 3/523* | (2006.01) | |
| *H04M 3/527* | (2006.01) | |
| *H04M 3/533* | (2006.01) | |

(52) U.S. Cl.
CPC .......... *G06F 21/32* (2013.01); *G06F 21/6245* (2013.01); *G06K 7/1417* (2013.01); *G06K 19/06037* (2013.01); *G06N 20/00* (2019.01); *G06Q 10/06315* (2013.01); *G06Q 30/016* (2013.01); *G06Q 30/0201* (2013.01); *H04M 3/523* (2013.01); *H04M 3/527* (2013.01); *H04M 3/53308* (2013.01); *H04M 3/53333* (2013.01); *G06F 2221/2139* (2013.01); *G06Q 30/0267* (2013.01)

(58) Field of Classification Search
CPC . G06Q 30/16; G06F 16/9558; G06F 16/9554; G06F 21/32; G06F 21/6245; G06F 2221/2139; G06N 20/00; G06K 7/1417; G06K 19/06037; H04M 3/523; H04M 3/527; H04M 3/53308; H04M 3/53333
USPC .............................................. 379/88
See application file for complete search history.

(56) References Cited

U.S. PATENT DOCUMENTS

| | | | |
|---|---|---|---|
| 8,783,571 B2 | 7/2014 | Sakahashi et al. | |
| 8,950,685 B1 | 2/2015 | Lin et al. | |
| 9,223,885 B2 | 12/2015 | Marsico | |
| 9,237,424 B2 | 1/2016 | Nelkenbaum | |
| 9,572,189 B2* | 2/2017 | Hayes, Jr. | G06Q 30/0242 |
| 9,883,373 B1* | 1/2018 | Meredith | H04W 8/06 |
| 10,230,522 B1* | 3/2019 | Roths | H04L 67/12 |
| 10,361,870 B2 | 7/2019 | Chow et al. | |
| 10,373,206 B2 | 8/2019 | Friborg, Jr. | |
| 10,645,037 B2 | 5/2020 | Schmid et al. | |
| 11,062,038 B2 | 7/2021 | Murphy et al. | |
| 11,201,737 B1 | 12/2021 | Will et al. | |
| 11,205,105 B1 | 12/2021 | Devlin et al. | |
| 11,210,648 B2 | 12/2021 | Ortiz et al. | |
| 11,368,454 B2 | 6/2022 | Whaley et al. | |
| 11,553,547 B2* | 1/2023 | Gilson | H04W 4/16 |
| 12,184,747 B2* | 12/2024 | Beroukhim | H04L 69/06 |
| 2007/0274488 A1* | 11/2007 | Callaghan | H04W 76/19 |
| | | | 379/201.01 |
| 2008/0064421 A1* | 3/2008 | Philbin | G06Q 30/02 |
| | | | 455/466 |
| 2010/0100964 A1* | 4/2010 | Mahaffey | G06F 21/577 |
| | | | 726/25 |
| 2011/0065421 A1* | 3/2011 | Gluck | G06Q 30/02 |
| | | | 455/414.1 |
| 2012/0028643 A1* | 2/2012 | Falchuk | H04L 65/80 |
| | | | 455/436 |
| 2012/0226743 A1 | 9/2012 | Smargon | |

(56) References Cited

U.S. PATENT DOCUMENTS

| | | |
|---|---|---|
| 2012/0278142 A1 | 11/2012 | Li |
| 2013/0144738 A1 | 6/2013 | Qawami et al. |
| 2014/0281967 A1* | 9/2014 | Bodnick .......... G06Q 10/06316 715/708 |
| 2014/0282967 A1* | 9/2014 | Maguire ........... H04W 52/0245 726/7 |
| 2015/0019317 A1 | 1/2015 | Mitchell |
| 2015/0039409 A1 | 2/2015 | Marsico et al. |
| 2015/0067074 A1* | 3/2015 | Ghosh Dastidar ...... H04L 51/58 709/206 |
| 2015/0179002 A1* | 6/2015 | Liao ....................... H04N 5/765 348/149 |
| 2015/0213503 A1 | 7/2015 | Friborg, Jr. |
| 2016/0078493 A1* | 3/2016 | Liberty .............. G06Q 30/0269 705/14.66 |
| 2016/0099963 A1* | 4/2016 | Mahaffey ............ H04L 63/166 726/25 |
| 2017/0078454 A1* | 3/2017 | Berookhim ............ H04W 4/80 |
| 2017/0214522 A1 | 7/2017 | Code et al. |
| 2017/0244555 A1 | 8/2017 | Beiter et al. |
| 2018/0005263 A1 | 1/2018 | McNulty et al. |
| 2018/0060914 A1* | 3/2018 | Conrad .................. H04L 67/146 |
| 2019/0347181 A1* | 11/2019 | Cranfill ................. H04L 63/102 |
| 2019/0354665 A1 | 11/2019 | Haslam et al. |
| 2020/0045020 A1 | 2/2020 | Soundararajan et al. |
| 2020/0184085 A1 | 6/2020 | Korten et al. |
| 2020/0186338 A1 | 6/2020 | Andon et al. |
| 2020/0242105 A1 | 7/2020 | Rich et al. |
| 2021/0092135 A1 | 3/2021 | Strogov et al. |
| 2021/0256070 A1 | 8/2021 | Tran et al. |
| 2021/0266989 A1* | 8/2021 | Rooney ................. H04W 24/02 |
| 2021/0306460 A1* | 9/2021 | Doumar ................ H04M 3/523 |
| 2021/0319116 A1 | 10/2021 | Jarvis |
| 2021/0326458 A1* | 10/2021 | Watson .................. G06N 20/00 |
| 2021/0398095 A1* | 12/2021 | Mallett .................. G06Q 50/01 |
| 2022/0093246 A1* | 3/2022 | Karri ..................... G16Y 10/75 |
| 2022/0201476 A1 | 6/2022 | Naujok et al. |
| 2022/0201477 A1 | 6/2022 | Rolfe |
| 2022/0309530 A1* | 9/2022 | Nathan ................... G06F 16/95 |
| 2022/0311611 A1 | 9/2022 | Gaur et al. |
| 2023/0262427 A1* | 8/2023 | Mumick ................ H04L 51/10 455/466 |

* cited by examiner

SYSTEM AND METHODS FOR AUTOMATED Wi-Fi SETUP ON INTEGRATED OPT-IN VIA TEXT REDIRECT

CROSS-REFERENCE TO RELATED APPLICATIONS

Priority is claimed in the application data sheet to the following patents or patent applications, each of which is expressly incorporated herein by reference in its entirety:
Ser. No. 18/191,872
Ser. No. 18/161,086
63/411,163
Ser. No. 17/942,227
63/319,314
Ser. No. 17/943,118
Ser. No. 17/875,402
Ser. No. 17/349,659
Ser. No. 17/348,660
Ser. No. 17/344,695
Ser. No. 17/229,251
63/166,391
Ser. No. 17/209,474
Ser. No. 17/208,059
Ser. No. 17/191,977
Ser. No. 17/190,260
Ser. No. 17/153,426
62/965,626
62/963,368
62/963,379
63/040,610
63/025,287
63/022,190
62/994,219
63/154,357
63/350,415
Ser. No. 17/409,841
Ser. No. 17/360,731
Ser. No. 17/085,931
63/025,287
63/022,190
62/963,568
62/940,607
Ser. No. 16/693,275
62/904,568
62/883,360
62/879,862
63/211,496
Ser. No. 17/351,321
63/411,876

BACKGROUND OF THE INVENTION

Field of the Art

The disclosure relates to the field of computer-based communication systems, and more particularly to opt-in and access management.

Discussion of the State of the Art

Many businesses offer free Wi-Fi as a customer benefit or an incentive to consent to advertising while using the network. However, sharing Wi-Fi connection settings to each customer can take up business resources and frustrate customers. Current solutions trade good security practices and customer engagement for ease of use, with the following two problems.

First, maximizing efficiency. Current solutions range from removing Wi-Fi passwords and placing signage informing customers of the Wi-Fi network name. This decreases security, increasing risks for customer and company devices connected to the network such as exposure to wardriving.

Second, obtaining customer consent is often performed at the point of connection to the network but before allowing customers to access the internet. Each click required by a customer, however, increases the likelihood that the customer will forgo connection and use their cellular data instead. Many businesses ask for only minimal consent or skip advertising to the customer, losing valuable business-customer exposures.

What is needed is a system and method for integrating automatic wi-fi setup following customer opt-in using text redirect.

SUMMARY OF THE INVENTION

Accordingly, the inventor has conceived, and reduced to practice, a system and method for automated wi-fi setup on a mobile device with text redirected opt-in. The first step is scanning a QR code with a user computing device, such as a mobile phone, that triggers a text message to auto-populate on the user computing device. The auto-populated message comprises a unique identifier. The second step is for the QR code to trigger the mobile device to connect to a network using encoded Wi-Fi network settings. Optionally, the system may integrate with a communications and interaction system.

According to a preferred embodiment, a system for automated Wi-Fi setup on integrated opt-in via text redirect, comprising: a computing device comprising a memory, a processor, and a non-volatile data storage device; a database stored on the non-volatile data storage device, comprising a plurality of client instructions, each client instruction of the plurality of client instructions comprising a scheme for generating placement of call-to-action elements, formatting instructions, and a consent procedure for verifying user consent to opt in; a messaging manager comprising a first plurality of programming instructions stored in the memory which, when operating on the processor, causes the computing device to: retrieve a client instruction from the database; generate a call-to-action element comprising coding instructions configured to generate a pre-filled short message service (SMS) or multi-media message service (MMS) message comprising a destination and an identifier, such that interaction with the call-to-action element on the user computing device causes the user computing device to populate the pre-filled SMS or MMS message with a user opt-in; receive the pre-filled SMS or MMS message; retrieve a plurality of client instructions from the database, the client instructions being selected based on the user opt-in; and execute the retrieved plurality of client instructions, is disclosed.

According to another preferred embodiment, a method for automated Wi-Fi setup on integrated opt-in via text redirect, comprising the steps of: retrieving, at a messaging manager, a client instruction from a database; generating a call-to-action element comprising coding instructions configured to generate a pre-filled short message service (SMS) or multi-media message service (MMS) message comprising a destination and an identifier, such that interaction with the call-to-action element on the user computing device causes the user computing device to populate the pre-filled SMS or MMS message with a user opt-in; receiving the pre-filled SMS or MMS message; retrieving a plurality of client instructions from the database, the client instructions being selected based on the user opt-in; and executing the retrieved plurality of client instructions, is disclosed.

BRIEF DESCRIPTION OF THE DRAWINGS

The accompanying drawings illustrate several aspects and, together with the description, serve to explain the principles of the disclosed embodiments. It will be appreciated by one skilled in the art that the particular arrangements illustrated in the drawings are merely exemplary, and are not to be considered as limiting of the scope of the claims herein in any way.

BRIEF DESCRIPTION OF THE DRAWING FIGURES

Figure 1:
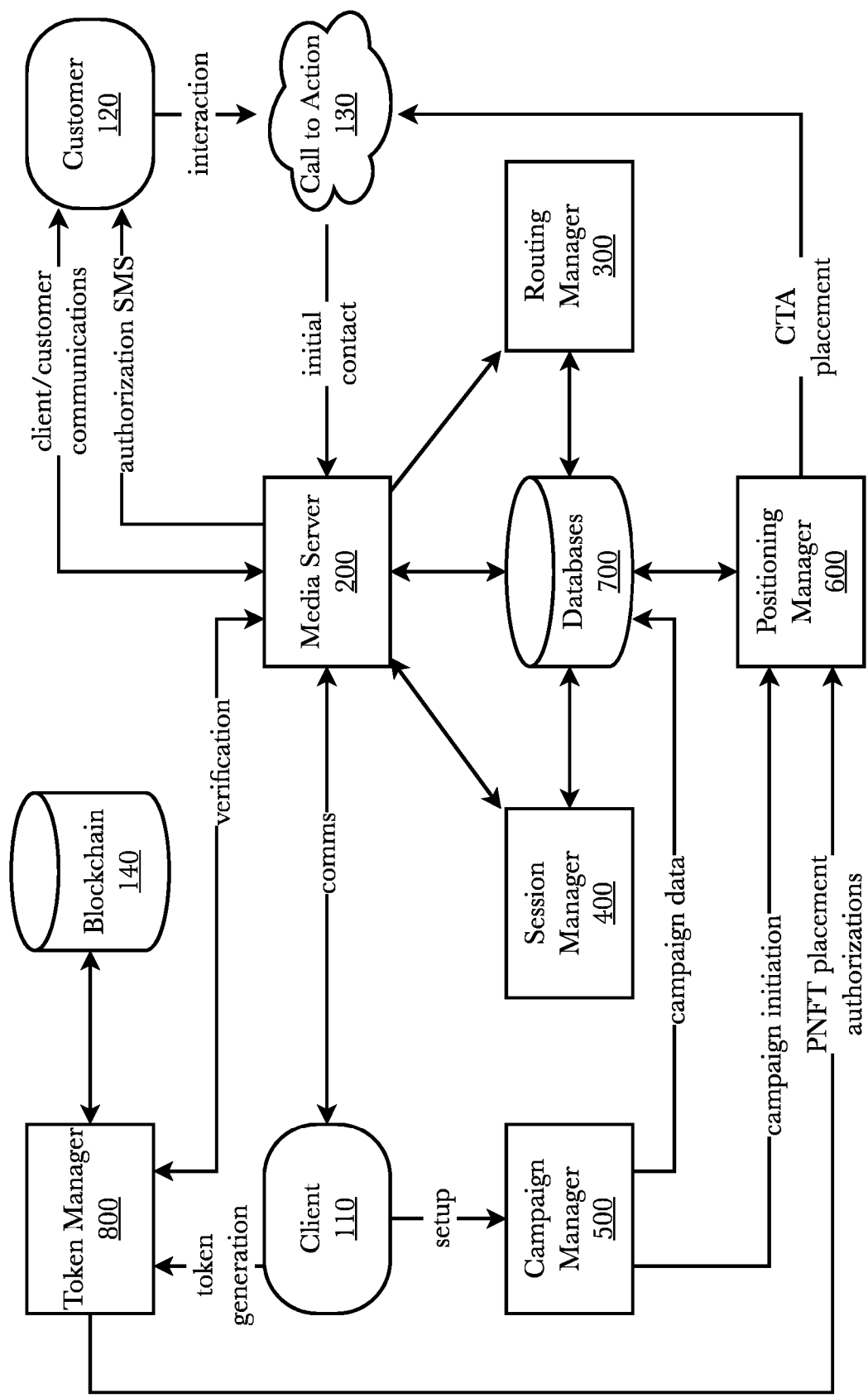
FIG. 1 is an exemplary system architecture for a communications and interaction system using SMS-based authorizations and personal non-fungible tokens.

The inventor has conceived and reduced to practiced, a system and method for automated wi-fi setup on a mobile device with text redirected opt-in. The first step is scanning a QR code with a user computing device, such as a mobile phone, that triggers a text message to auto-populate on the user computing device. The auto-populated message comprises a unique identifier. The second step is for the QR code to trigger the mobile device to connect to a network using encoded Wi-Fi network settings. Optionally, the system may integrate with a communications and interaction system.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in said arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 is an exemplary system architecture for a communications and interaction system using SMS-based authorizations and personal non-fungible tokens. In this exemplary embodiment, the system comprises a media server 200, a routing manager 300, a session manager 400, a campaign manager 500, a positioning manager 600, databases 700, and a token manager 800. The system facilitates communications and interactions between clients 110 and customers 120 using calls to action 130. A client 110 is any person or entity (e.g., a business entity) wishing to engage in communications or interactions and who has established a marketing campaign or established a personal non-fungible token (PNFT) for that purpose. A customer 120 is any person or entity (e.g., a business entity) wishing to engage in communications or interactions with a client 110. Communications and interactions between clients 110 and customers 120 are initiated by a customer's interaction with a call to action (CTA) 130. The CTA 130 is any means for contacting a client 110 through the system comprising a way to identify the CTA 130 and the client with which it is associated. For online and other digital CTAs (websites, emails, in-app advertisements, etc.), the CTA 130 will generally be generated and placed by the system in accordance with a client's 110 marketing campaign rules or PNFT rules. However, non-electronic CTAs are also possible such as printed CTAs in print advertising, signage, or in-store displays.

The media server 200 acts as the communication channel interface between client and customer devices, passing various forms of communications media (emails, texts, traditional telephone, VOIP, etc.) between the devices. The routing manager 300 selects an appropriate routing for incoming and outgoing communications based on information from the session manager. The session manager 400 creates and manages each communication session between a client and customer by creating a session initiation protocol (SIP) communication sessions for each communication between a client and customer using the CTA identifier, the customer's contact information, and information about the communications medium being used. The session manager 400 monitors and logs the session and terminates the session when the communication ends. The campaign manager 500 provides the client with an interface through which the client may create automated advertising campaigns which may be dynamically adjusted based on feedback from customer interactions with CTAs and other information. The positioning manager 600 creates campaign instances from a campaign, and automatically determines where and when to place CTAs for each campaign instance depending on scheduling, targeting, and budgeting goals. The databases 700 store campaign information, client information, and customer information. The token manager 800 interfaces with a blockchain 140 and provides an interface for design and generation of PNFTs, establishment of automation rules for interactions with PNFTS, and verification of identities using PNFTs.

Figure 2:
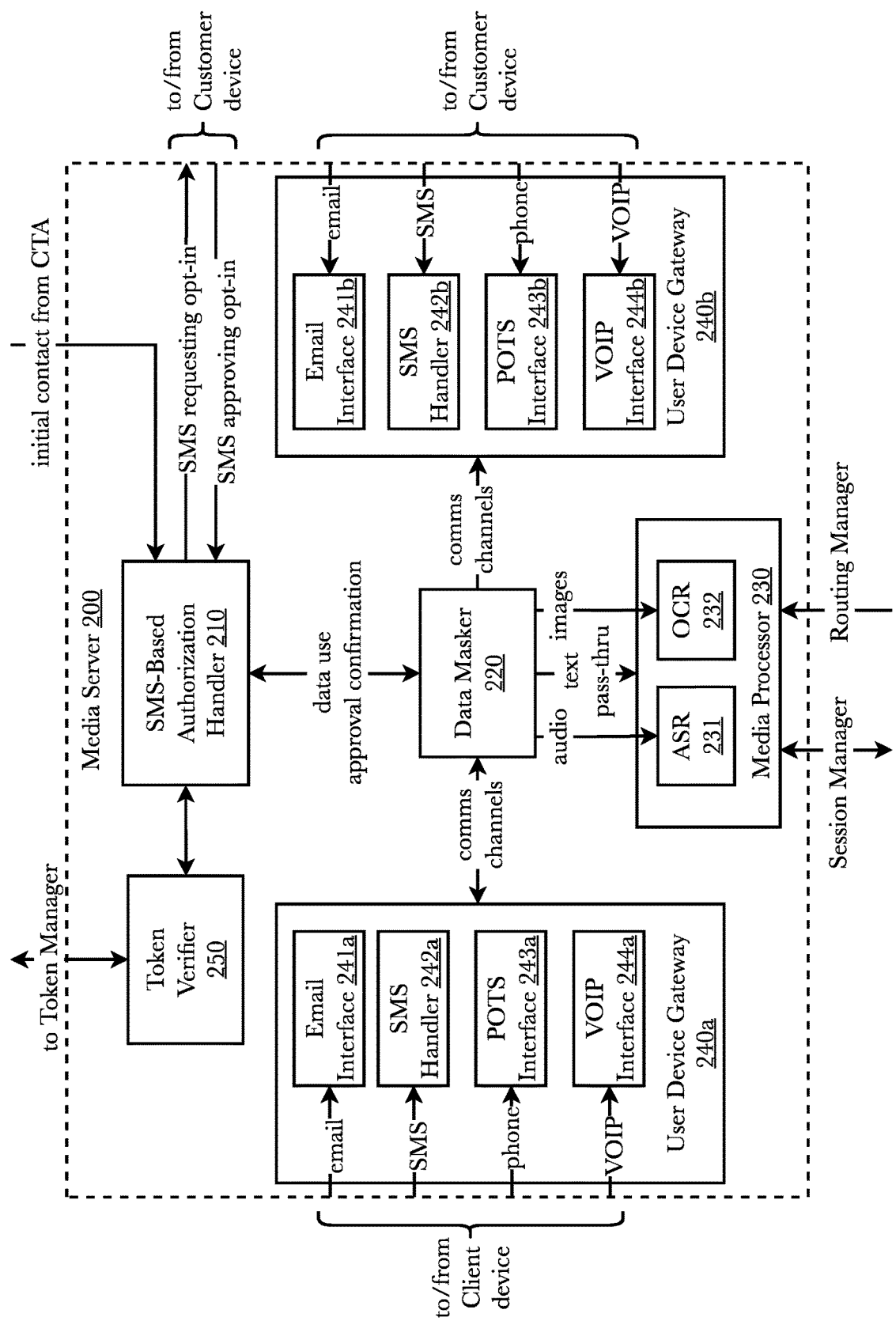
FIG. 2 is an exemplary media server aspect of a communications and interaction system using SMS-based authorizations and personal non-fungible tokens.

FIG. 2 is an exemplary media server aspect of a communications and interaction system using SMS-based authorizations and personal non-fungible tokens. The media server 200 acts as the communication channel interface between client and customer devices, passing various forms of communications media (emails, texts, traditional telephone, VOIP, etc.) between the devices. In this embodiment, the media server comprises an SMS-based authorization handler 210, a data masker 220, a media processor 230, user device gateways 240a,b, on both the client and customer sides, and a token verifier 250.

In this embodiment, an SMS-based authorization handler 210 is shown as part of the media server 200. The SMS-based authorization handler 210 handles the data use authorization (also called an "opt-in") process via text messages. Using the SMS-based authorization handler 210, the system is configured to facilitate interactions by utilizing a short message service (SMS) authorization methodology wherein interaction with a CTA on a smartphone initiates a series of SMS messages back and forth to the media server 200 which authorizes communications between the user of a smartphone (a customer) and a third party associated with the CTA (a client). When the customer interacts with the CTA on his or her smartphone, the CTA accesses the smartphone's text messaging application and causes the smartphone to generate a first SMS on the smartphone which has been pre-filled with an SMS address code for the SMS-based authorization handler 210 of the media server 200 and a CTA identifier. When the first SMS is sent from the smartphone, the SMS-based authorization handler 210 of the media server 200 receives the first SMS, captures the CTA identifier and phone number of the smartphone, and sends a second SMS back to the smartphone containing a link and a request for authorization to send the phone number to a third party for communications (e.g., "To authorize Company X to call you back on phone number Y to purchase product Z, click here."). Clicking on the link in the second SMS sends a third SMS back to the SMS-based authorization handler 210 of the media server 200 authorizing the transmission of the phone number to a client so that the client may contact the customer. In this way, authorization for capture of the customer's phone number and establishment of communications with a client can be established simply by having the customer click on two automatically-generated SMS messages without having to otherwise enter any data on the smartphone. This method works universally on all smartphones with SMS technology without having to install additional applications. The data use approval confirmation received by the customer is logged and passed to other components of the system (e.g., to the session manager via the data masker) to confirm authorization to use private information. Note that while SMS technology is the primary example used herein, the invention is not so limited and other forms of mobile device interactions may be used, provided that an identifier for the mobile device can be obtained from the interaction (e.g., multi-media message service (MMS) messages, email addresses from email headers, caller ID from phone calls, caller ID from VOIP calls, etc.).

A data masker 220 operating on the media server 200 preserves the privacy of both client and customer by masking the phone number, email addresses, and other identifying information of the parties until they voluntarily exchange confidential information between themselves via the communications medium. As the data masker 220 is privy to the private information of the parties, it can establish a connection with each party separately using the private information, and they join the parties together via a real-time communications medium (e.g., phone) without having to pass the private information to each of the parties or can forward non-real-time communications between the parties (e.g., emails) while stripping identifying information from the transmitted messages (e.g., from the email headers).

The media processor 230 converts audio and image communications media to text, and passes through text communications to the session manager 400. For example, where the interaction with the CTA is in audio form (e.g., a call to a phone number printed on the CTA), the audio from the interaction may be sent to an automated speech recognition (ASR) processor 231 (also known as a speech-to-text (STT) processor) to convert the speech from the audio into text. Where the interaction with the CTA is a transmitted image (e.g., a photo of the CTA sent by MMS), the image from the interaction may be sent to an optical character recognition (OCR) processor 232 to extract any text in the image (e.g., the CTA identifier). The converted text is then sent to the NLP engine to be processed as with the interactions in text form. Any text interactions with the CTA (e.g., text messages), are passed through to the session manager 400.

User device gateways 240a, 240b on both the client side and customer side both comprise a plurality of interfaces 241a-244a, 241B-244b receive and transmit communications to and from client and customer devices. For simplicity and clarity, a single user device gateway is shown on the client end 240a and on the customer end 240b, each comprising an email interface 241a,b, a short message service (SMS) handler 242a,b, a plain old telephone (POTS, or traditional telephone line) interface 243a,b, and a voice-over-Internet-protocol (VOIP) interface 244a,b. While these are the most common media interfaces, the user device gateways 240a,b may have other such communications media interfaces and there may be a plurality of user device gateways 240a,b on either side.

Figure 3:
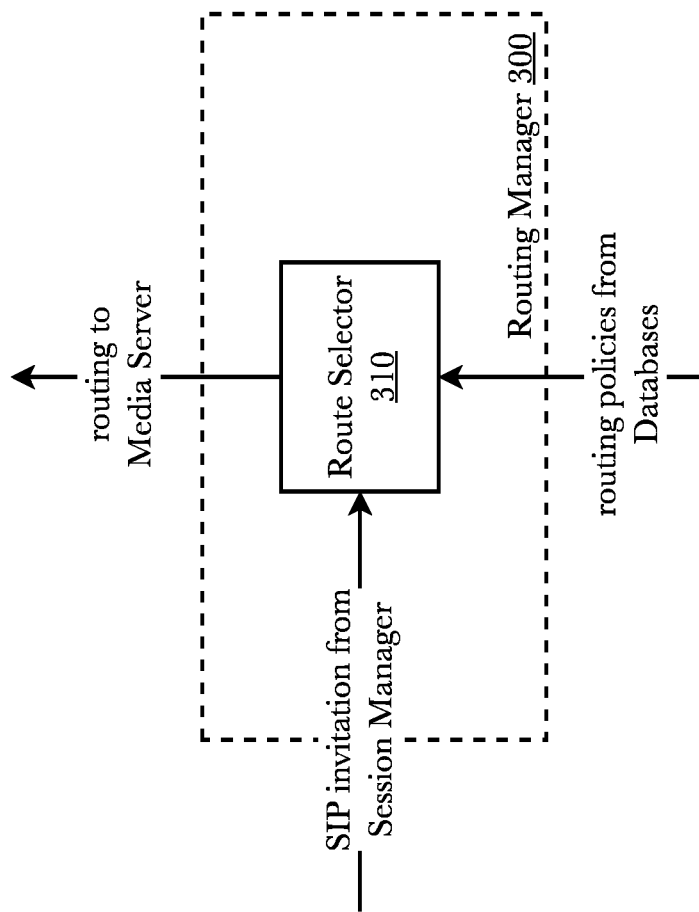
FIG. 3 is an exemplary routing manager aspect of a communications and interaction system using SMS-based authorizations and personal non-fungible tokens.

FIG. 3 is an exemplary routing manager aspect of a communications and interaction system using SMS-based authorizations and personal non-fungible tokens. In this embodiment, the media server 200 sends connection information to the session manager 400. Where a customer has interacted with a CTA, the connection information initially comprises a communications medium (e.g., mobile phone service), the customer's contact information for that communications medium (e.g., a phone number), and an identifier for the CTA (e.g., a CTA identification number or string). The session manager initiates a session initiation protocol (SIP) session by issuing an SIP invitation to the routing manager 300. The routing manager 300 receives the SIP invitation, retrieves one or more routing policies from the databases 700 using a route selector 310, determines an appropriate routing for the communication (e.g., to salesperson X at company Y who handles sales of the type of product advertised by the identified CTA), and sends the routing information to the media server 200, which proceeds to establish the connection.

The routing manager 300 selects an appropriate routing for incoming and outgoing communications based on information from the session manager. In this embodiment, the media server 200 sends connection information to the session manager 400. Where a customer has interacted with a CTA, the connection information initially comprises a communications medium (e.g., mobile phone service), the customer's contact information for that communications medium (e.g., a phone number), and an identifier for the CTA (e.g., a CTA identification number or string). The session manager initiates a session initiation protocol (SIP) session by issuing an SIP invitation to the routing manager 300. The routing manager 300 receives the SIP invitation, retrieves one or more routing policies from the databases 700 using a route selector 310, determines an appropriate routing for the communication (e.g., to salesperson X at company Y who handles sales of the type of product advertised by the identified CTA), and sends the routing information to the media server 200, which proceeds to establish the connection.

Figure 4:
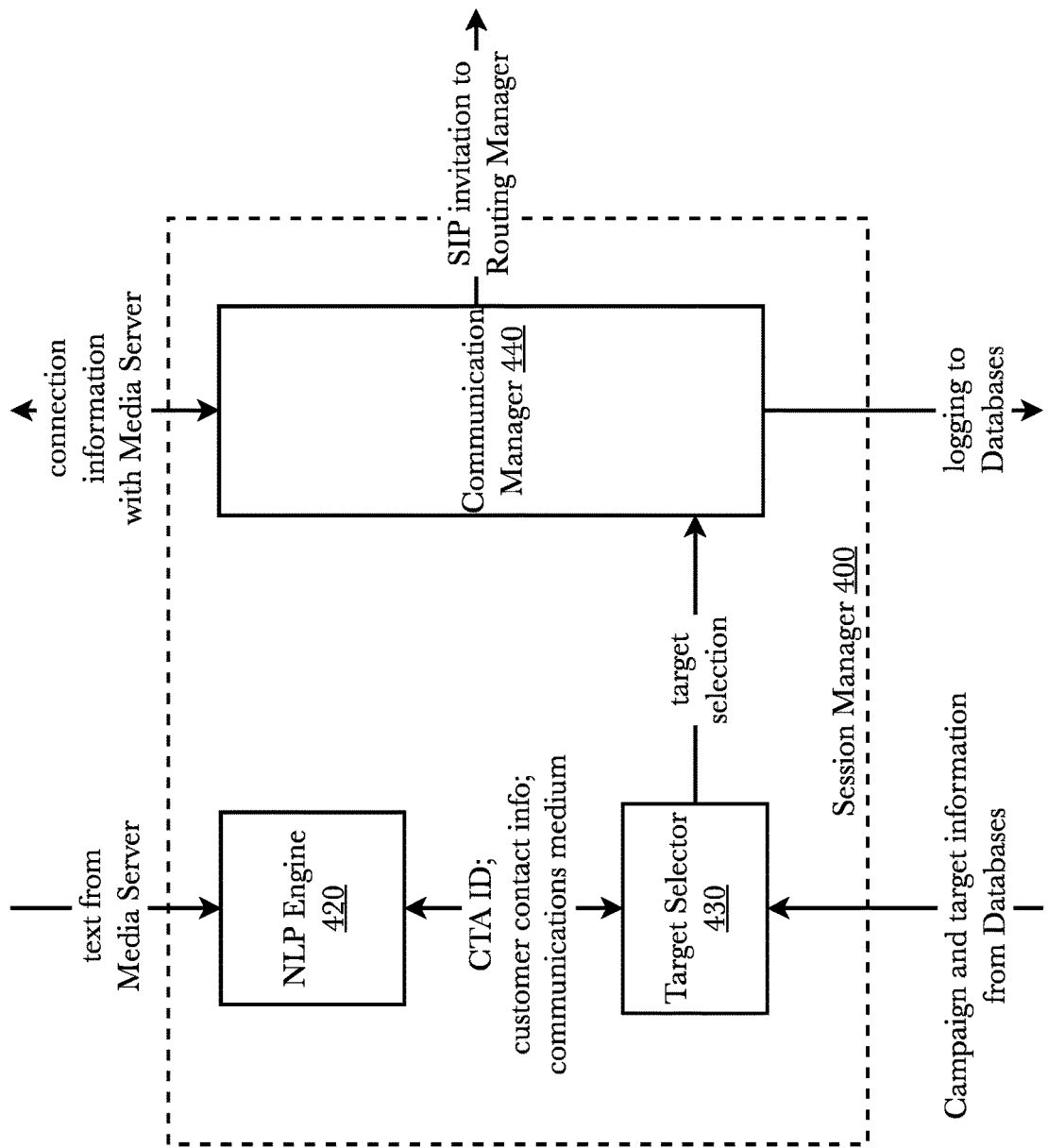
FIG. 4 is an exemplary session manager aspect of a communications and interaction system using SMS-based authorizations and personal non-fungible tokens.

FIG. 4 is an exemplary session manager aspect of a communications and interaction system using SMS-based authorizations and personal non-fungible tokens. The session manager 400 creates and manages each communication session between a client and customer. The session manager 400 creates session initiation protocol (SIP) communication sessions for each communication between a client and customer using the CTA identifier, the customer's contact information, and information about the communications medium being used. The session manager 400 monitors and logs the session, and terminates the session when the communication ends. In this embodiment, the session manager comprises a natural language processing (NLP) engine 420, a target selector 430, and a communication manager 440.

Where a customer has interacted with a CTA, an identifier for the CTA is obtained from one of a variety of methods (e.g., an identifier embedded in a link, a call to certain phone numbers designated to handle CTAs of a certain type, a CTA identifier in a text message from the customer, etc.). In this embodiment, where the interaction with the CTA is in text form (e.g., clicking on a website link CTA generates a pre-populated SMS containing the CTA identifier on the customer's mobile device which is sent to the media server), the text from the interaction with the CTA is sent to a natural language processing engine 420 which parses the text to extract the CTA ID, and possible other contextual information (such as the terms "lease" or "buy," which may determine to which department a lead is sent), along with the customer contact information (in this example, the phone number of the customer's mobile device from which the SMS was sent) and the communications medium (in this case, a return phone call to the phone number of the customer in response to the SMS).

Thus, the connection information initially comprises a communications medium (e.g., mobile phone service), the customer's contact information for that communications medium (e.g., a phone number), and an identifier for the CTA (e.g., a CTA identification number or string). Using the CTA identifier, the campaign and target information associated with the CTA identifier are retrieved from a campaign database for the relevant client, and a target selector 430 selects an appropriate client target to receive the communication depending on the connection information (e.g., a salesperson X in department Y at company Z who specializes in the type of product advertised by the CTA). After the target is selected, a communications manager 440 of the session manager 400 initiates a session initiation protocol (SIP) session by issuing an SIP invitation to the routing manager 300. After creation of the session, the communication manager 440 monitors and logs the session, and terminates the session when the communication ends.

Should the initially-selected target not be available, the target selector 430 may initiate a routing script that queries the databases 700 to determine next target resource. This process may be repeated until all potential targets of the client in the campaign are exhausted (i.e. no client resource is available to accept the call for that CTA). In that event, the voice call may be routed to a voicemail system corresponding to one of the client's resources or a general voicemail box. A notification of the failed attempt to connect with a live client resource may be sent to the client.

Figure 5:
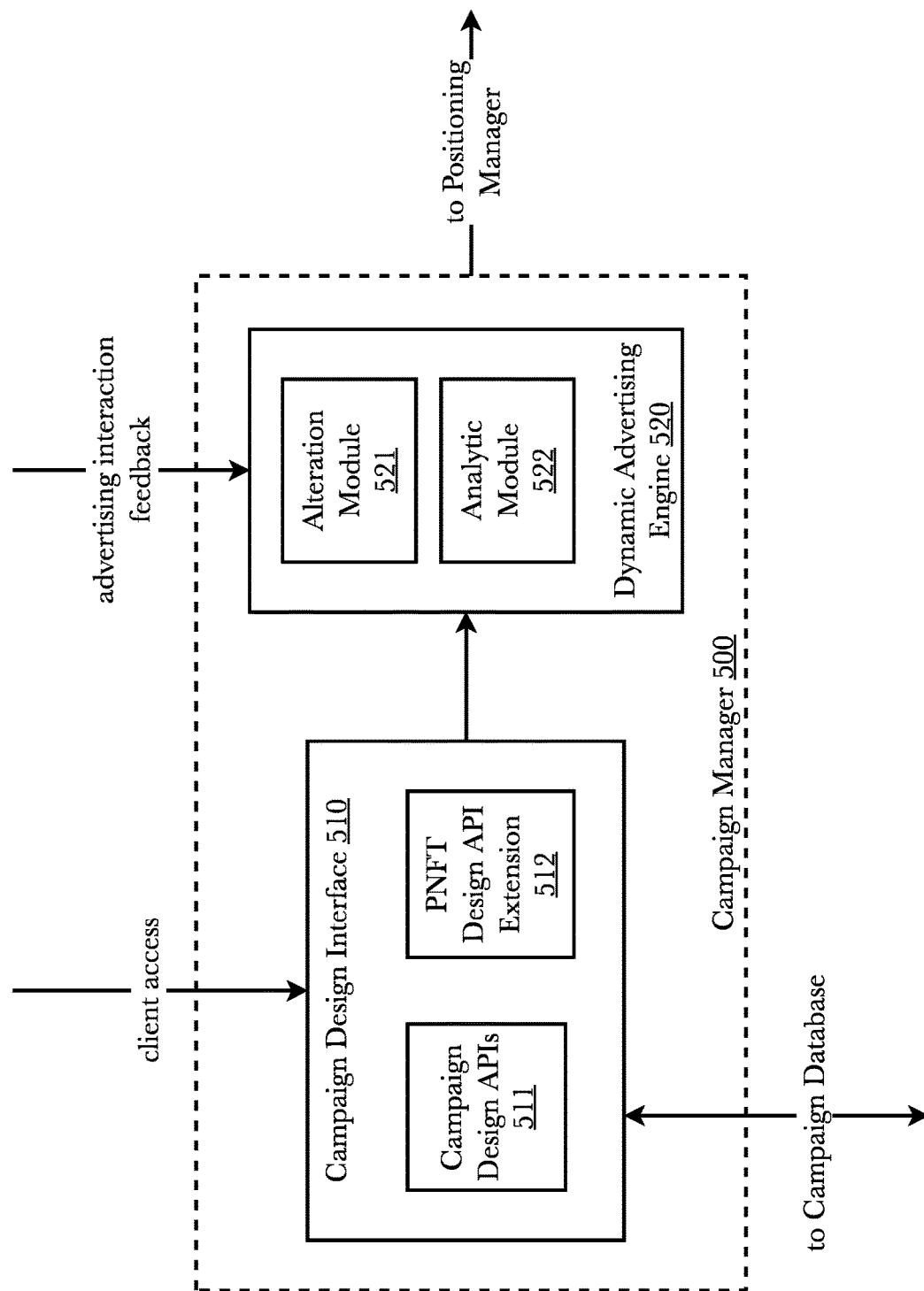
FIG. 5 is an exemplary campaign manager aspect of a communications and interaction system using SMS-based authorizations and personal non-fungible tokens.

FIG. 5 is an exemplary campaign manager aspect of a communications and interaction system using SMS-based authorizations and personal non-fungible tokens. The campaign manager 500 provides the client with an interface through which the client may create automated advertising campaigns which may be dynamically adjusted based on feedback from customer interactions with CTAs and other information. In this embodiment, the campaign manager comprises a campaign design interface 510 and a dynamic advertising engine 520.

The campaign design interface 510 comprises one or more campaign design APIs 511 which allow clients to set up campaigns comprising products and services, target audiences, rules, schedules, budgets, and the like. Each campaign design API 511 provides one or more aspects of the interface such as a graphical interface, rule creation tools, budgeting tools, target audience selection tools, etc., and the collection of the campaign design APIs 511 allows the client to define complete marketing campaigns, which are stored in the campaign database of the databases 700. If PNFTs are used, the PNFT design API extension 512 allows access to a similar PNFT design interface in the token manager 800 for creation and implementation of PNFTs.

Once a marketing campaign is created and implemented, the dynamic advertising engine 520 can be configured to make automatic changes to the campaign (or an aspect of a campaign) based on feedback from interaction with CTAs and other information such as product or service sales numbers. In some embodiments, ad variants may be generated by dynamic advertisement engine 520. In some embodiments, ad variants may be generated semi-autonomously with input from business personnel. For example, dynamic advertisement engine 520 may receive data associated with an ad campaign and analyze it, and based on the analytic data it may suggest an element of an advertisement to be altered, which can then be reviewed and implemented by a client representative such as a business marketing manager. In some embodiments, ad variants may be generated autonomously. For example, dynamic advertisement engine 520 may receive analytic data associated with an ad campaign and based on the received data it may suggest an element of an advertisement to be altered, which can be automatically applied to the ad via the ad campaign data stored in campaign database 730.

A purpose of utilizing ad variants is to gather useful data about the efficacy, efficiency, and profitability of a given advertisement and/or an ad campaign. Implementing two similar ads with the only difference between the two being a single element alteration (i.e., AB testing) can allow businesses to understand how elemental choices for an advertisement affect customer interaction. For example, an ad campaign for a hiking boot may be developed with the tagline "Reach New Heights With These Boots," and a variant ad may be developed the tagline "Tough On The Mountain, Gentle On Your Feet," wherein the only difference between both ads is the tagline. Both the baseline ad and the variant ad can then be deployed and customer engagement data with both the baseline and variant can be monitored and analyzed to determine which of the baseline or the variant led to better outcomes for the business running the ads and/or ad campaign. In some embodiments, ad campaign data may include a test plan for configuring the deployment of two variant advertisements. For example, a test plan may describe what element is to be tested and subsequently altered, the goals of the test plan (e.g., improving conversion rates), initial state of advertisement (i.e., baseline metric that describes current state of advertisement), the order of element alterations to be made, test design (e.g., how long to test the variants, which devices to test on, etc.) and the like. In some embodiments, test plans may be received, retrieved, or otherwise obtained from campaign database 730 by dynamic advertisement engine 520 as an input into suggesting element alterations.

According to some embodiments, the analytic module 522 may receive, retrieve, or otherwise obtain a plurality of data such as, but not limited to, details of interactions with CTAs, media stream data, ad campaign data, survey data, and business data, and may process the plurality of data in order to determine the efficacy of a given advertisement and/or ad campaign. In some embodiments, analytic module 522 may receive data pertaining to at least two advertisements comprising a baseline advertisement and a variant advertisement, and determine which of the two advertisements produced better results based upon analysis of the received data.

According to some embodiments, analytical data such as, for example, a determination of a better advertisement between at least two advertisements, may be received, retrieved, or otherwise obtained by dynamic advertisement engine 520. Dynamic advertisement engine 520 and/or alteration module 521 may process the analytical data together with ad campaign data (e.g., test plan information) in order to suggest at least one advertisement element to alter in order to form a new variant of an advertisement. For example, data analytics suggest that a first variant of a baseline advertisement was better at leading to product sales than the baseline version of the advertisement, and responsive to this analysis alteration module 521 can suggest an element alteration to the first variant to form a second variant. The first and second advertisement variants may then be deployed to various platforms via position manager 600 and the process of collecting data related to advertisement engagement/interaction can begin again using the first and second variant, wherein after statistically relevant data is collected, analytic module 522 may make a determination of whether the first variant or the second variant was better. The determination of a "better" advertisement can be based on statistically significant metrics such as, for example, ad clicks and conversion rates. In the case that the differences between two advertisements are statistically insignificant, dynamic advertisement engine 520 may suggest no alterations to an element. In some embodiments, the element to be altered is the same type of element (e.g., the tagline is altered between two advertisements).

In some embodiments, dynamic advertisement engine 520 may receive, retrieve, or otherwise obtain third party data to be used as an input when making element alteration suggestions. Because marketing is such a vital component of any business within any industry, there is a lot of market research data available regarding advertisement content and configuration which may be used by dynamic advertisement engine 520 to determine appropriate and effective element alterations. For example, studies have shown that an advertisement with a red call-to-action button outperforms a green call-to-action button by about 21%. The large difference in click rate between such a minor change shows the importance of testing different variants of a given advertisement in order to maximize customer engagement and improve conversion rates.

Figure 6:
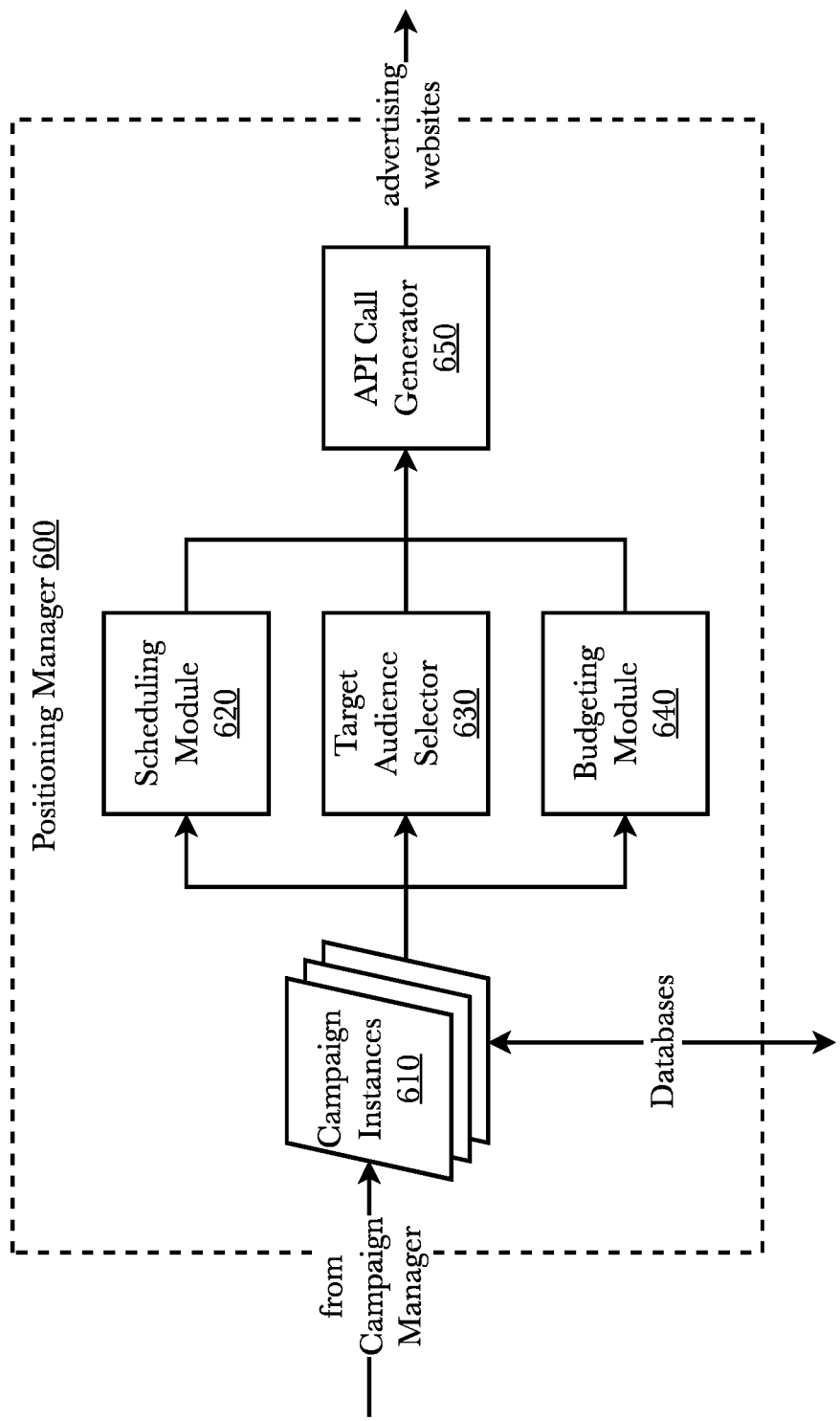
FIG. 6 is an exemplary positioning manager aspect of a communications and interaction system using SMS-based authorizations and personal non-fungible tokens.

FIG. 6 is an exemplary positioning manager aspect of a communications and interaction system using SMS-based authorizations and personal non-fungible tokens. In this embodiment, the positioning manager 600 creates campaign instances from a campaign, and automatically determines where and when to place CTAs for each campaign instance depending on scheduling, targeting, and budgeting goals.

The positioning manager 600 receives notification of the initiation of a campaign from the campaign manager, retrieves relevant information about the campaign from the databases 700, and creates one or more campaign instances 610 for implementation of the campaign. Not all campaigns will have multiple instances. Depending on the campaign configuration, each campaign instance will represent some portion or division of the campaign for implementation. For example, in a campaign by a dealership for automobile sales, instances may be generated for different types of cars which will be marketed to different target audiences. Campaign instances 610 will typically have rules associated scheduling, target audiences, and budgets. In this embodiment, each instance will is analyzed by a scheduling module 620 to identify scheduling rules and constraints and output an advertisement schedule, a target audience selector 630 to identify relevant target audiences and output a target audience selection, and a budgeting module 640 to track budgeting expenditures for the instance and output a remaining budget amount for advertising of the instance. The outputs of the scheduling module 620, target audience selector 630, and a budgeting module 640 are send to an API call generator 650, which generates an appropriate API call to a third party advertiser in accordance with the third party advertiser's ad placement API (as one example, the Google Ads API has more than 200 parameters that can be set to determine where and when an ad should be placed on its platform).

Figure 7:
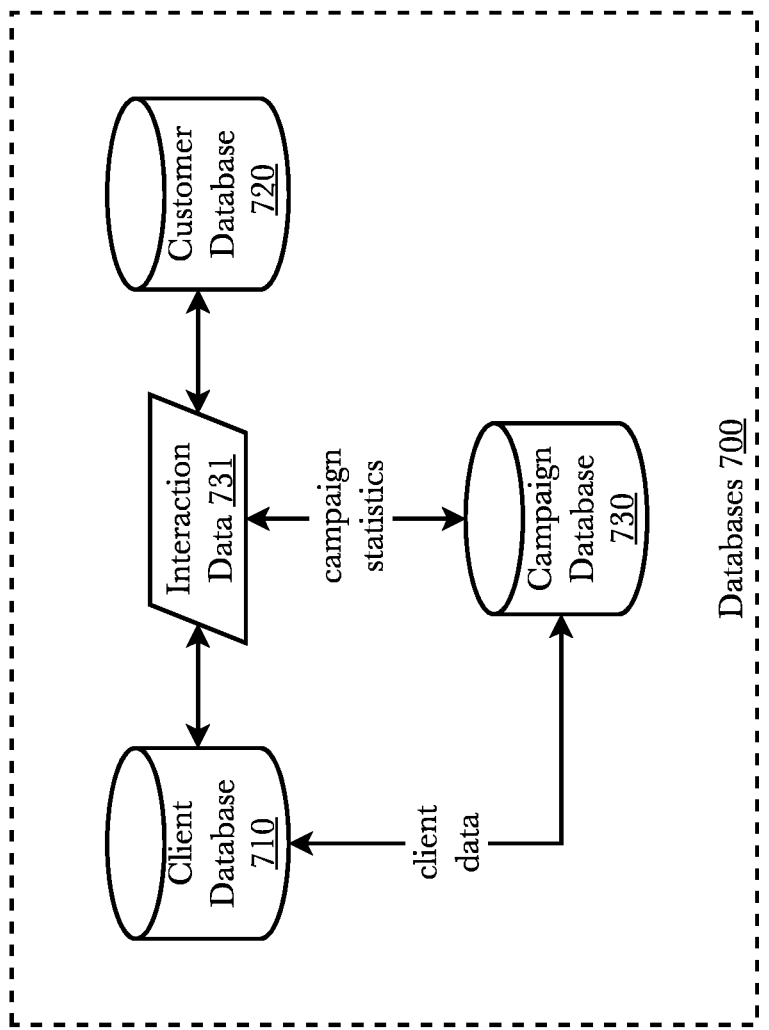
FIG. 7 is an exemplary set of databases for a communications and interaction system using SMS-based authorizations and personal non-fungible tokens.

FIG. 7 is an exemplary set of databases for a communications and interaction system using SMS-based authorizations and personal non-fungible tokens. The databases 700 store campaign information, client information, and customer information.

The client database 710 comprises information about the client for facilitating communications between clients and customers such as client contact information; target information for the client such as subsidiaries, office locations, departments, units, agents, sales representatives, and employees; logs of interactions with customers; records of the products, services, and campaigns associated with certain customers; and lists of campaigns associated with the client.

The customer database 720 comprises information about the client for facilitating communications between clients and customers such as customer contact information, logs of CTAs with which the customer has interacted, records of the products, services, and campaigns associated with CTAs with which the customer has interacted, customer purchase history, customer preferred contact method (e.g. mobile phone, e-mail), customer preferred contact times, and customer previous interaction history.

The campaign database 730 may take the form of a managed or unmanaged database, document-oriented database system, or SQL database, or other suitable form of database. Examples of types of database software that may operate include MYSQL™, ORACLE DATABASE™, MONGODB™, and others. The campaign database 730 may exist as a distinct physical device or be operating on another computing device that may perform other functions aside from operating, hosting and serving the campaign database 730. If the campaign database 730 is a distinct physical device, the database may be connected over a LAN or WAN, the Internet, a direct physical connection to another device, or some other network connection. The campaign database 730 may be a centralized database system. The campaign database 730 may be a distributed database system.

The campaign database 730 may be configured to store a plurality of ad campaigns including the associated ad campaign data for each ad campaign in the ad campaign database 730. In some embodiments, the ad campaign data specifies the different media platforms that will be used to broadcast the ad campaign. In some embodiments, ad campaign data may include one or more variants of an advertisement. In some embodiments, an advertisement variant may be an advertisement where at least one element of the advertisement has been altered in some form. Non-limiting examples of advertisement elements include: headlines and copywriting; call to actions (CTAs); images, audio, and video; subject lines (e.g., email ads); content depth (i.e., how much information to include in ad); product descriptions (e.g., length, placement, etc.); social proof (e.g., customer/purchaser reviews of product); media mentions; and landing pages. In some embodiments, elements may further include font, colors, ad placement, time and location (e.g., when and where is ad displayed), and audience.

Interaction data 731 may be generated from any interactions between clients and customers and may be stored in any of the three databases 710-730, as necessary.

Figure 8:
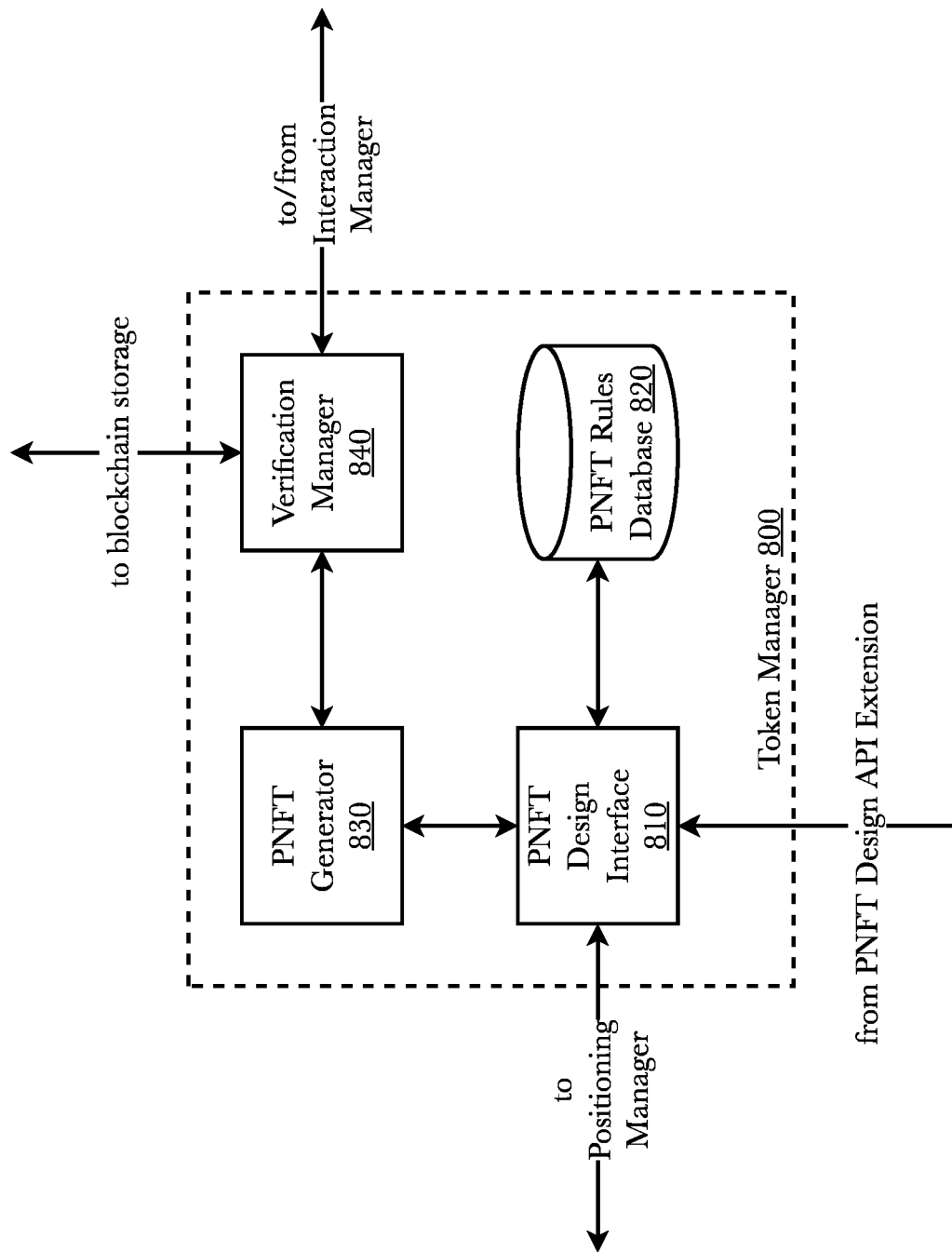
FIG. 8 is an exemplary token manager aspect of a communications and interaction system using SMS-based authorizations and personal non-fungible tokens.

FIG. 8 is an exemplary token manager aspect of a communications and interaction system using SMS-based authorizations and personal non-fungible tokens. The token manager 800 provides an interface for design and generation of PNFTs, establishment of automation rules for interactions with PNFTS, and verification of identities using PNFTs. In this embodiment, the token manager comprises a PNFT design interface 810, a PNFT rules database 820, a PNFT generator 830, and a verification manager 840.

The PNFT design interface 810 may be accessed directly or may be accessed via the PNFT design API extension 512 of the campaign manager 500. The PNFT design interface allows to set up personal non-fungible tokens (PNFTs) as universal, secure identities for online communications, interactions, and exchanges wherein each PNFT uniquely associates an image, sound, or other digital asset with a person's identity using a non-fungible token (NFT). An image, sound, or other digital asset is stored on a blockchain as an NFT, which uniquely and immutably associates the digital asset with the account owning that digital asset, thereby establishing a unique, secure personal identifier (a "personal non-fungible token" or PNFT) of the person owning that account for online communications and interactions. Links to the PNFT (also sometimes herein called "calls to action" or CTAs similarly those associated with marketing campaigns) can be customized via an online platform such that interaction with a given link or type of link initiates automated actions. Further, the online platform can be configured to automatically place the customized links to the PNFT in locations which will facilitate communications and interactions with the owner of the PNFT such as on websites, in communications such as emails and short message service (SMS) communications, and in advertisements and marketing messages.

Similarly to the campaign design APIs 511 of the campaign manager, the PNFT design interface 810 may comprise a graphical interface, rule creation tools, budgeting tools, target audience selection tools, etc., allowing the client to design automated rule sets for individual PNFT CTAs, groups of PNFT CTAs, or types of PNFT CTAs, whereby customer interactions with a given CTA will initiate certain automated actions such as requesting contact with the client, requesting authorization from the client, production of information to the client, or establishment of communications with the client. The CTAs associated with PNFTs operate similarly to CTAs associated with marketing campaigns, but are secure identifiers for a person or entity, and are not necessarily associated with marketing activity. For example, a CTA for a PNFT on a website may contain a company's trademarked logo. Interaction with the CTA provides automatic verification to the person interacting with the CTA that the website is, in fact, owned by the owner of the CTA. Thus, although CTAs for PNFTs can be used for marketing, they function primarily as secure personal identifiers and means for personal interaction with the owner of the PNFT (which can also be a business). The rules for automation of CTAs for PNFTs are stored in a PNFT rules database 820. A PNFT generator 830 generates PNFTs for each client and sends each generated PNFT to a verification manager 840 for verification of the uniqueness of the PNFT (i.e., that there is no duplicate of that particular PNFT for that particular client) and storage of the PNFT as an immutable entry on a blockchain. Because blockchains are immutable and all records of a blockchain are permanently stored on the blockchain, this ensures that each PNFT will be unique. The verification manager 840 also serves to verify the identity of the owner of a given PNFT by verifying the PNFT's identifier on the blockchain. Note that while each PNFT is unique, it is possible for the same person or entity to have more than one PNFT (e.g., the person may have a personal PNFT and also be the owner of multiple businesses, each with its own PNFT).

Figure 9:
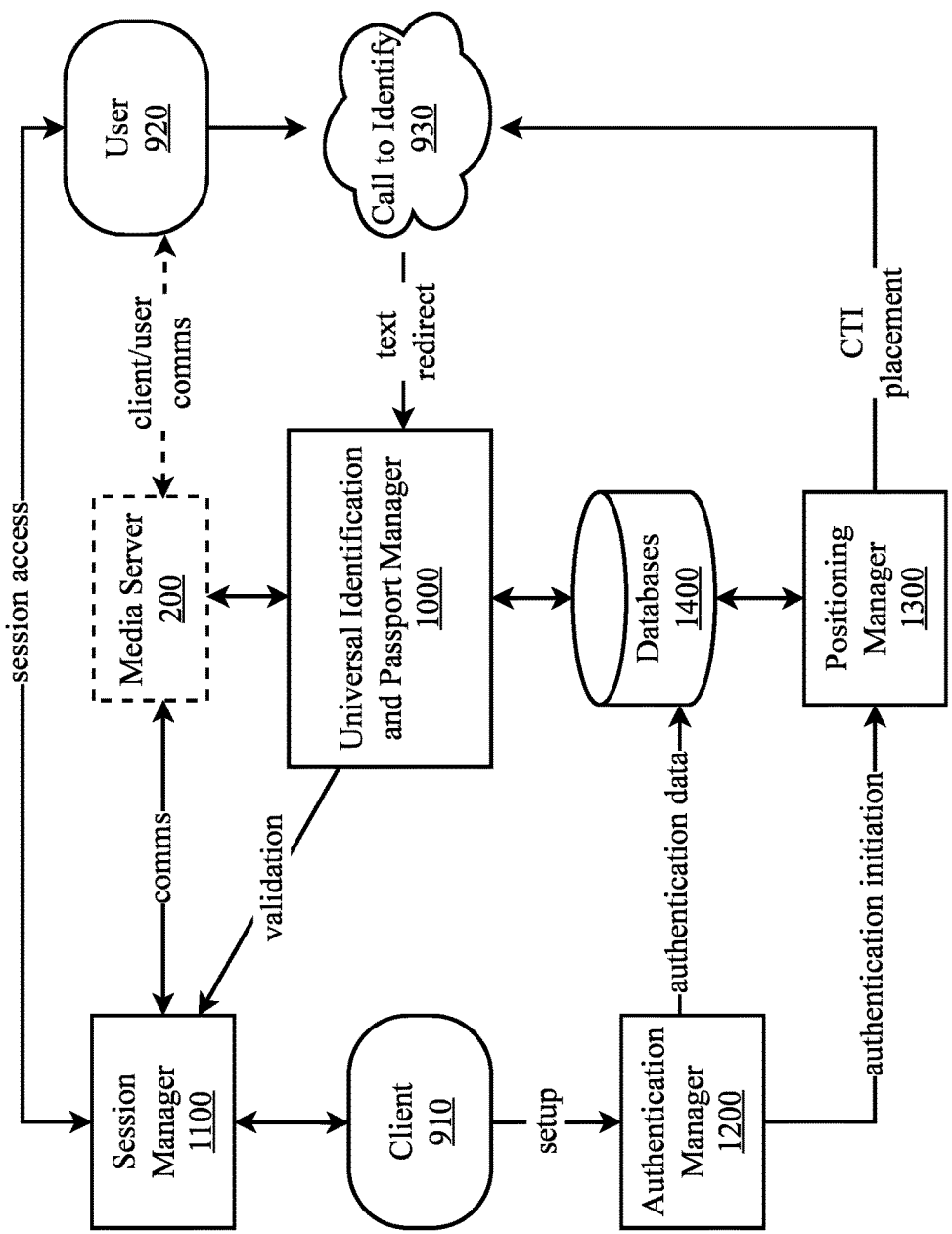
FIG. 9 is an exemplary system architecture of a universal identification and passport management system using a phone identifier and text redirect.

FIG. 9 is an exemplary system architecture of a universal identification and passport management system using a phone identifier and text redirect. In this exemplary embodiment, the system comprises a universal identification and passport manager 1000, a media server 200, a session manager 1100, an authentication manager 1200, a positioning manager 1300, and databases 1400. The system facilitates user identification and access authorization between clients 910 and users 920 using calls to identify 930. A client 910 is any system or app seeking to identify a user and validate their access privileges and which has set up authentication instructions for that purpose. A user 920 is any person seeking to authenticate their identity and receive validated access privileges with a client 910. Identification and authentication between clients 910 and users 920 are initiated by a user's interaction with a call-to-identify (CTI) 930. A CTI 930 means any design to prompt an immediate response or encourage a user device to identify itself and the user with which it is associated. For online and other digital CTIs (e.g., clickable buttons, links, digital sign on, NFC beacons), the CTI 930 will generally be generated and placed by the system in accordance with a client's 910 authentication rules. However, non-electronic CTIs are also possible such as printed CTIs in print advertising, signage, or in-store displays.

The universal identification and passport manager 1000 acts as the validation interface between client and user, validating the user's identity through various identifiers (phone number, international mobile equipment identity (IMEI) code, biometric data, IP address, user identity data). The media server 200 acts as the communication channel interface between client and customer devices, passing various forms of communications media (emails, texts, traditional telephone, VOIP, etc.) between the devices. The session manager 1100 creates and manages each validated session between a client and user by creating a session initiation protocol (SIP) communication session for each validated session between a client and user using the CTI validation, the user's universal identification passport, and information about the client/user communications through the media server 200. The session manager 1100 monitors and logs the session, checks for activity-based de-authentication cues, and de-authenticates the session when an activity-based de-authentication cue is identified and activity is not resumed, the session validation times out based on the client's authentication instructions, or the user ends the session. The authentication manager 1200 provides the client with an interface through which the client may create authentication instructions which may be dynamically adjusted based on feedback from user interactions with CTIs and other information. The positioning manager 1300 creates authentication instances from an instruction, and automatically determines where and when to place CTIs for each authentication instance depending on scheduling, targeting, and budgeting goals. The databases 1400 store authentication instructions, client information, and user information.

Figure 10:
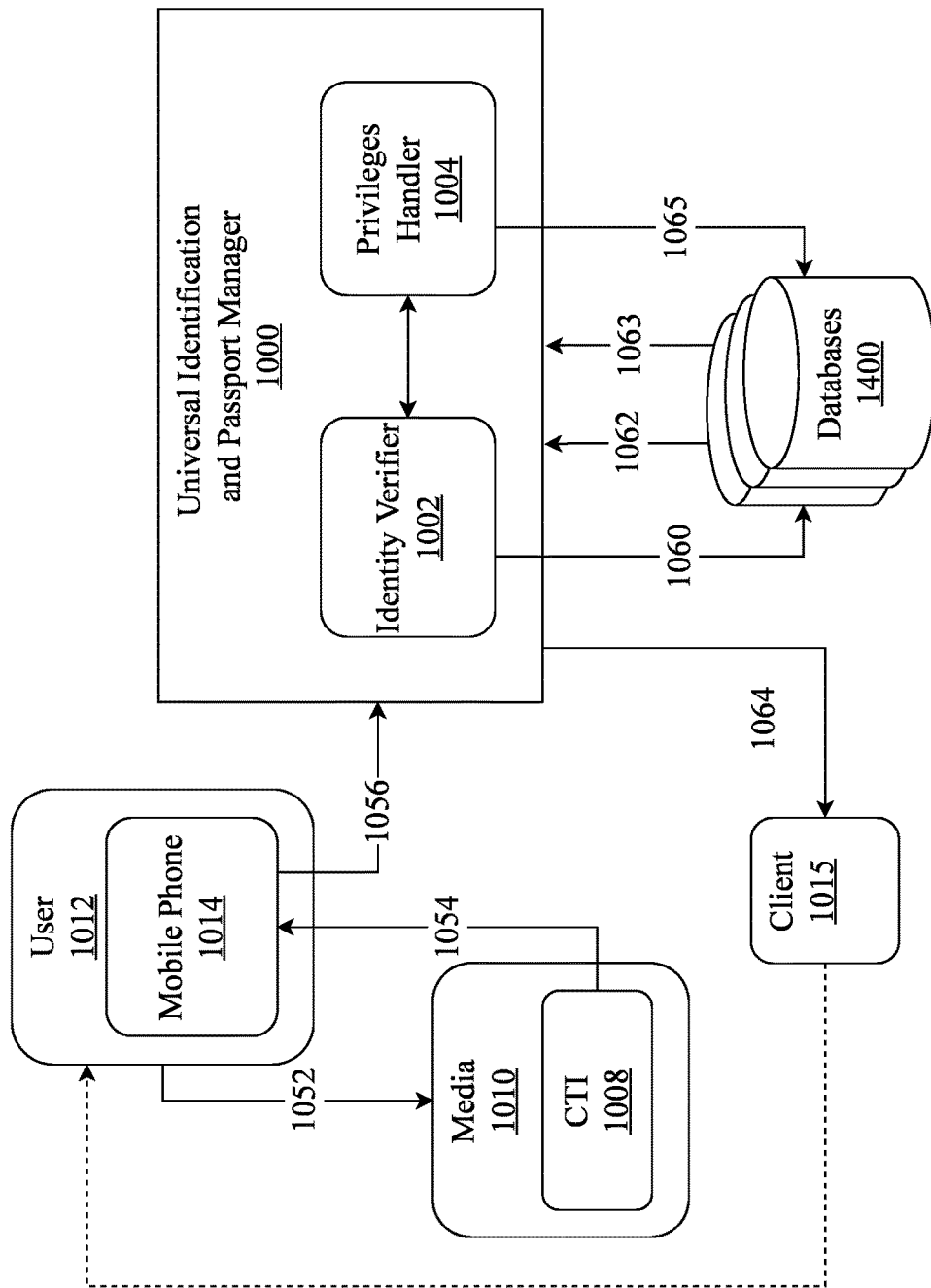
FIG. 10 is a block diagram illustrating an exemplary universal identification and passport manager aspect of a universal identification and passport management system using a phone identifier and text redirect.

FIG. 10 is a block diagram illustrating an exemplary universal identification and passport manager aspect of a universal identification and passport management system using a phone identifier and text redirect. Universal identification and passport manager 1000 links to an initiating "call-to-identify" (CTI) 1008 associated with a request for user authentication. A CTI 1008 may be embedded in media 1010 of various forms, a preferred form being a NFC-enabled beacon broadcasting the CTI or a scannable QR code, however, other forms are anticipated including, but not limited to, a clickable button hosted on a website or a clickable link served via email which, on user interaction, triggers a text redirect, executing code to populate an SMS or MMS message on the user's mobile phone or device containing an authentication identifier.

Initialization of universal identification and passport manager 1000 comprises storing authorization instructions and user information, including user identity and user privilege data, in databases 1400 and everything related to the authorization (e.g., procedures, instructions, rules, initiator ID, etc.) is called a procedure 1080. The identifier may be autogenerated by an algorithm, or taken sequentially from a list, or other methods known to those in the art. Additionally, each procedure must have at least stored authentication instructions for identifying a user 1012 through their mobile phone 1014 using at least the identifier, the user's phone number, and the user's device IMEI. Other factors may be utilized including but not limited to location-based services, facial recognition, previous user interactions and session data and so forth.

A CTI 1008 containing the unique identifier may be generated embedded in appropriate media 1010 for the client's authentication and security goals. A non-exhaustive list includes printed materials such as billboards, posters, and flyers; and electronic means such as clickable buttons, advertisements, URLs, push notifications, etc.

With the universal identification and passport manager 1000 initialized, a user 1012 will observe media 1010 containing a CTI 1008 and use his or her mobile phone or device 1014 to engage 1052 with the media 1010 and trigger the CTI 1008, for example scanning a QR code, which will cause the device 1014 to perform a text redirect by propagating a text message 1054 with destination and content including at least the identifier associated with the specific CTI instance. The user 1012 need only press the send key/button to send the message 1056. The message sent 1056 from the user's mobile phone 1014 is received by the universal identification and passport manager 1000 which logs at least the user's phone number and device IMEI from the message 1056. This data is first passed to an identity verifier 1002 which queries 1060 a user database 1400 using the phone number and device IMEI and returns a user identity 1062. The identity verifier 1002 also queries 1060 an authentication database 1400 using the identifier to return a specific set of authentication instructions 1063. The identity verifier 1002 uses the returned data to validate the user identity using the stored data associated with the specific user 1012 and by following the authentication instructions 1063. In one embodiment, the universal identification and passport manager then notifies 1064 the client 1015 of the successful verification and the client acts based on that notification. In another embodiment, the identity verifier 1002 passes the successful verification to the privileges handler 1004 for privilege management handled within the universal identification and passport manager 1000, such as saving login credentials for an online service or website to the user database 1400. Other privilege handling functions include updating 1065 the user information with new privileges, increased or decreased privileges, or removing stored privileges from the user's saved information. In one example, a client which is a website sets up authenticate via Whisp which enables users to create an account using the universal identification and passport manager. The user, while visiting the website using their mobile phone, clicks a button or text to initiate the authentication protocol, propagating the text message on the user's phone. The user taps the send button, prompting the universal identification and passport manager to retrieve the client's saved authentication instructions, identify the user by providing at least the user's phone number to the client, and grant new account privileges and save them to the user identity profile stored in the user database. At the same time, the user may opt in to receive marketing messages from the client via SMS or MIMS. This method provides the user with increased ease of identification as well as increased security by reducing the amount of user data stored across client accounts.

Figure 11:
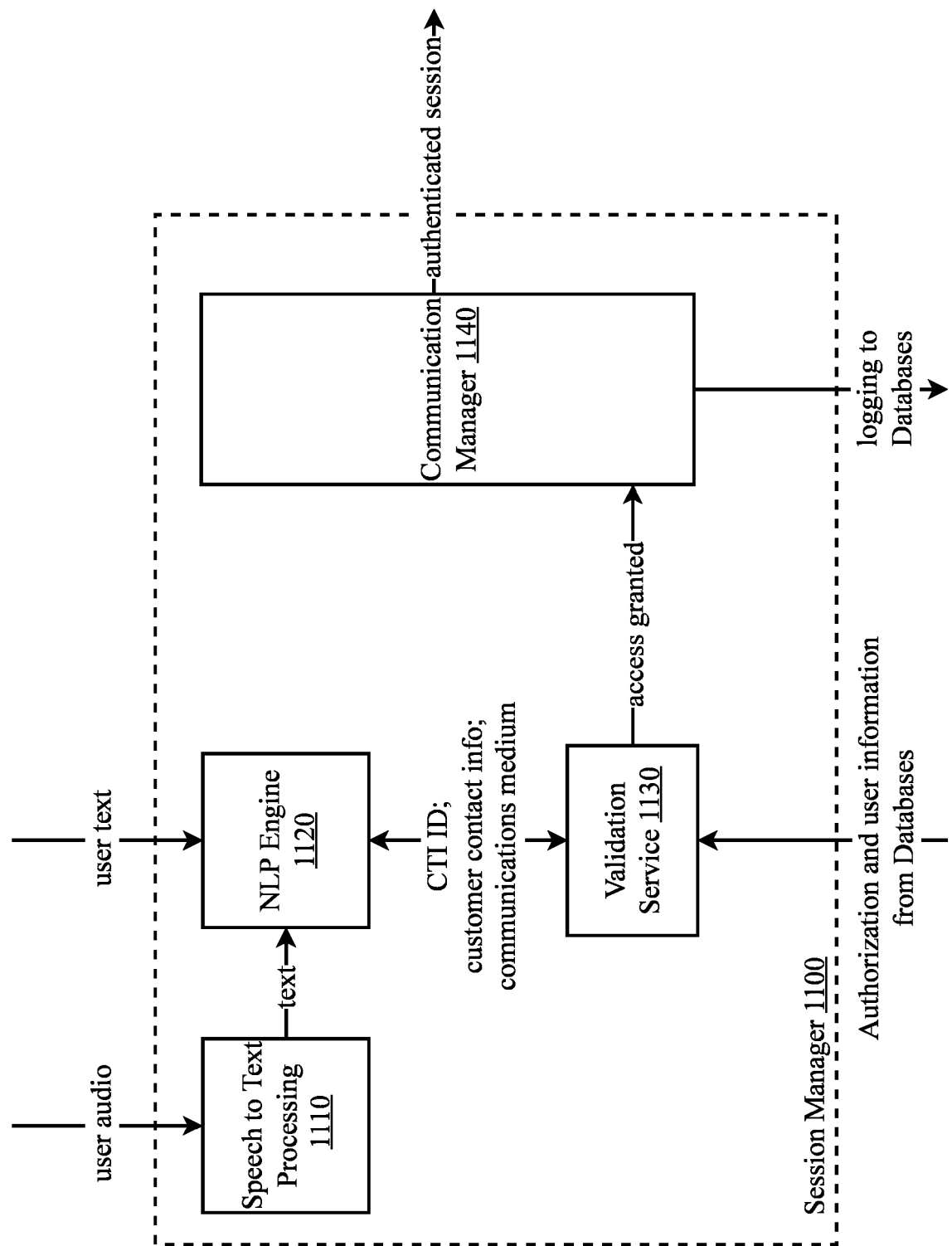
FIG. 11 is an exemplary session manager aspect of a universal identification and passport management system using a phone identifier and text redirect.

FIG. 11 is an exemplary session manager aspect of a universal identification and passport management system using a phone identifier and text redirect. The session manager 1100 creates and manages authenticated sessions between a client and user by creating a session initiation protocol (SIP) communication using the CTI identifier, the user's identification and privilege information, and information about the resources being accessed. The session manager 1100 monitors and logs the session, and terminates the session when the authentication expires or de-authentication is triggered, such as when a time-limited authentication reaches the maximum allotted time without renewal by the user, when there has been no user activity for a client-specified amount of time, the user has left the physical location, the user has entered a different authorization area, the user has accepted an SMS offer to de-authenticate, or the user has interacted with a CTI embedded with de-authentication instructions, such as tapping out of a service or location. The session manager 1100 may also manage multi-authentication sessions where the user interacts with a multi-session CTI and the session manager passes the user identification data to automatically identify the user for each successive CTI interaction. For example, a security guard patrolling a shopping mall may interact with a CTI to open a multi-session CTI for the duration of a scheduled shift, where the shopping mall uses NFC beacons to limit access to storage rooms, non-public entry points or corridors, individual units, etc. After the security guard completes the initial multi-session CTI, the security guard is identified and authorized. The authorization may be limited to a specific time frame before requiring a renewal, which may be performed via SMS request from the universal identification and passport manager with an SMS response from the user. During the authenticated period, the security guard may access any resource for which privileges were initially identified; approaching an NFC-enabled locked door while carrying the user computing device will unlock the door for the security guard to pass through. Passively triggering another CTI embodied in an NFC beacon on the other side of the door may lock the door behind the security guard. This multi-session CTI may be de-authenticated following de-authentication instructions set by the client, such as on deviation from the anticipated access route or time between access points, requiring re-authentication to continue or triggering a notification to the client of a deviation.

In this embodiment, the session manager comprises a natural language processing (NLP) engine 1120, a target selector 1130, and a communication manager 1140.

In an embodiment, an identifier for the CTI is obtained from a text message from the user following an interaction with a CTI and the text from the interaction with the CTI is sent to a natural language processing engine 1120 which parses the text to extract the CTI ID and possible other contextual information (such as additional authentication added to the identification by the client, e.g., a passcode or security phrase automatically embedded in the populate SMS, added to the SMS by the user, or requested via SMS following the initial SMS and subsequently provided by the user) along with the user identification information. Using the CTI identifier, the authentication instructions associated with the CTI identifier and user identification and privileges information are retrieved from a database for the relevant access point, and a validation service verifies that the user identification and privileges satisfy the requirements listed in the authentication instructions. Access is granted after validation succeeds. A communication manager 1140 of the session manager 1100 may then initiate an authenticated session between the client and user, monitor and log the session, renew or de-authenticate the user's access, and terminate the session. In another embodiment, a user may interact by sending voice notes or audio clips rather than a text message which is then passed through speech to text processing 1110 and converted to text and passed to the NLP engine 1120.

Figure 12:
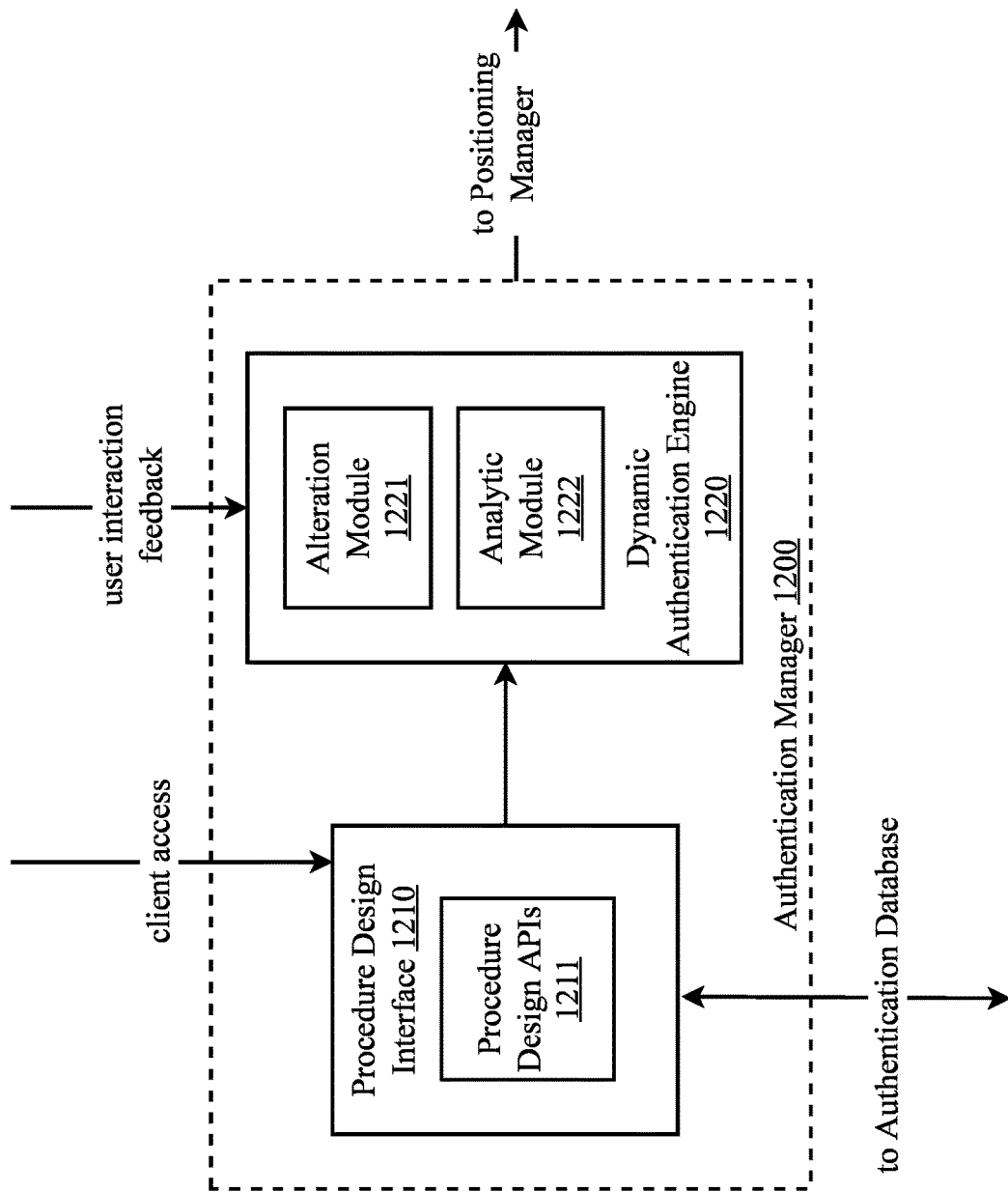
FIG. 12 is an exemplary authentication manager aspect of a universal identification and passport management system using a phone identifier and text redirect.

FIG. 12 is an exemplary authentication manager aspect of a universal identification and passport management system using a phone identifier and text redirect. This diagram is derived from the previous system architecture diagram of FIG. 26 of the parent application (63/319,314) and prior applications that have been incorporated herein by reference. The authorization manager 1200 provides the client with an interface through which the client may create automated authentication procedures which may be dynamically adjusted based on feedback from user interactions with CTIs and other information. In this embodiment, the procedure manager comprises a procedure design interface 1210 and a dynamic authentication engine 1220.

The procedure design interface 1210 comprises one or more procedure design APIs 1211 which allow clients to set up procedures comprising location and service access, account logins, privilege requirements, authentication instructions, maps of authentication systems including access points and area restrictions, etc. Each procedure design API 1211 provides one or more aspects of the interface such as a graphical interface, requirements or instructions creation tools, mapping tools, credential conversion tools, etc., and the collection of the procedure design APIs 1211 allows the client to define complete authentication procedures, which are stored in the authentication database of the databases 1400.

Once an authentication procedure is created and implemented, the dynamic authentication engine 1220 can be configured to make automatic changes to the procedures (or an aspect of a procedure) based on feedback from interaction with CTIs and other information such as session data. In some embodiments, authentication variants may be generated manually or semi-autonomously with input from the client. For example, dynamic authentication engine 1220 may receive data associated with an authentication procedure and analyze it, and based on the analytic data it may suggest an element to be altered by alteration module 1221, which can then be reviewed and implemented by a client representative such as an IT manager or security manager. In some embodiments, authentication variants may be generated autonomously. For example, dynamic authentication engine 1220 may receive analytic data associated with an authentication procedure and based on the received data it may suggest an element of an authentication to be altered by alteration module 1221, which can be automatically applied to the authentication via the authentication procedure data stored in authentication database 1410.

A purpose of utilizing authentication variants is to gather useful data about the efficacy, efficiency, and security of a given authentication and/or an authentication procedure. Implementing two similar authentications with the only difference between the two being a single element alteration (i.e., AB testing) can allow clients to understand how elemental choices for an authentication affect client interaction. For example, an authorization procedure for an online streaming service may be developed to enable clients to more easily and securely identify themselves to access their accounts from new or temporary locations and a variant authorization may be developed embodying the CTI in a different method or requiring different identification information to grant access. Both the baseline authentication and the variant authentication can then be deployed and user engagement data with both the baseline and variant can be monitored and analyzed to determine which of the baseline or the variant led to better outcomes for the client requiring the identification. In some embodiments, test plans may be received, retrieved, or otherwise obtained from authentication database 1410 by dynamic authentication engine 1220 as an input into suggesting element alterations.

According to some embodiments, the analytic module 1222 may receive, retrieve, or otherwise obtain a plurality of data such as, but not limited to, details of interactions with CTIs, interaction data, session data, and authentication data, and may process the plurality of data in order to determine the efficacy of a given authentication and/or authentication procedure. In some embodiments, analytic module 1222 may receive data pertaining to at least two authentications comprising a baseline authentication and a variant authentication, and determine which of the two authentications produced better results based upon analysis of the received data.

Figure 13:
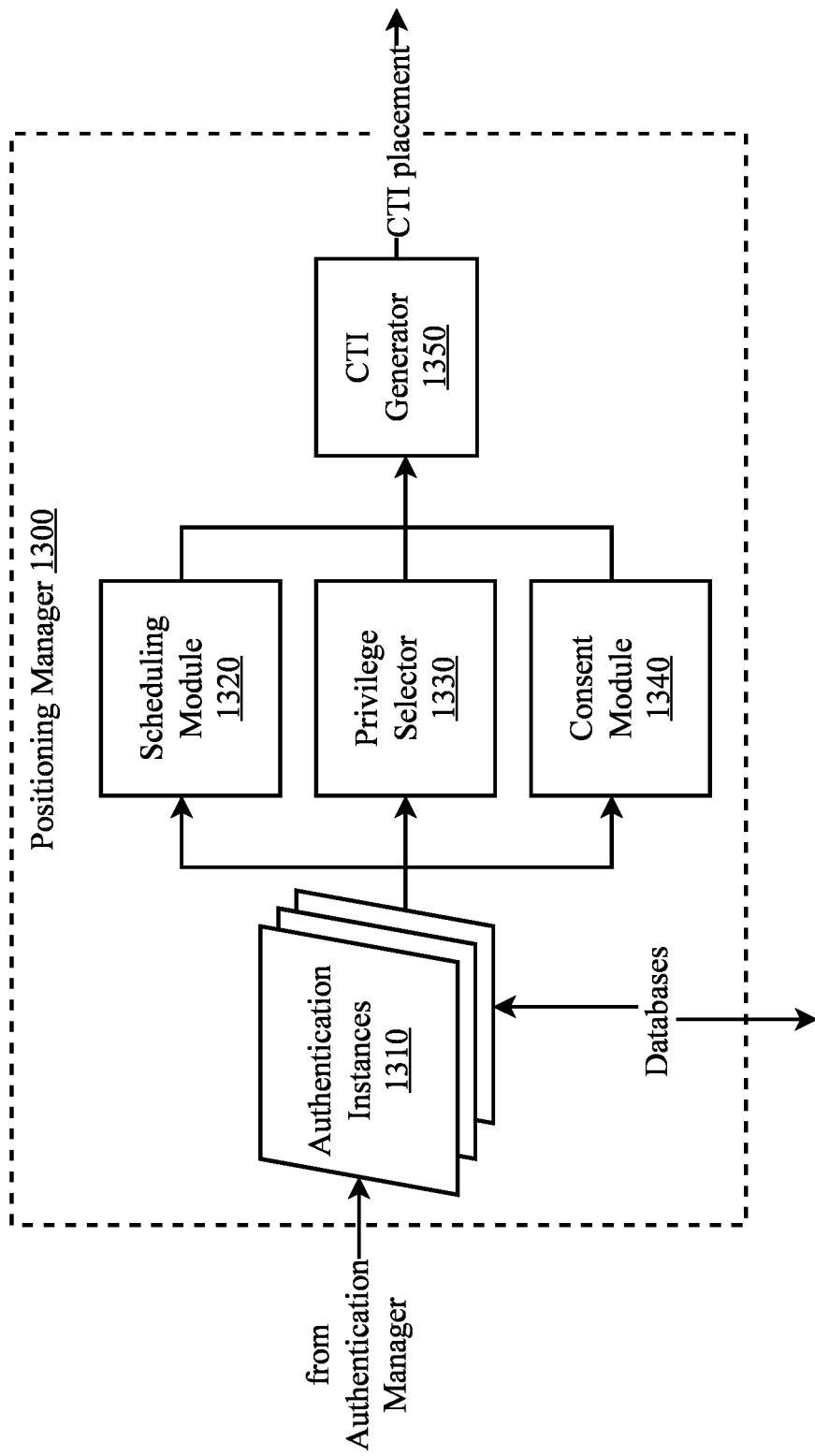
FIG. 13 is an exemplary positioning manager aspect of a universal identification and passport management system using a phone identifier and text redirect.

FIG. 13 is an exemplary positioning manager aspect of a universal identification and passport management system using a phone identifier and text redirect. In this embodiment, the positioning manager 1300 creates authentication instances from a client's authentications, and automatically determines where and when to place CTIs for each authentication instance depending on scheduling, privilege, and communication goals.

The positioning manager 1300 receives notification of the initiation of an authentication scheme from the authentication manager, retrieves relevant information about the authentication from the databases 1400, and creates one or more authentication instances 1310 for implementation of the authentication. Not all authentication will have multiple instances. Depending on the authentication configuration, each authentication instance will represent some portion or division of the authentication for implementation. For example, in an authentication scheme for a bank location, instances may be generated for different physical areas which will be assigned different schedule or privilege requirements for granting access, such as time limiting patron access to teller-assisted banking areas or requiring employee privileges to access certain areas. Authentication instances 1310 will typically have rules associated with scheduling, privileges, and communications. In this embodiment, each instance is analyzed by a scheduling module 1310 to identify scheduling rules and constraints and output an authentication schedule, a privilege selector 1330 to identify privilege requirements and output a required privileges selection range, and a consent module 1340 to identify communication requests for the instance and output requested communications for obtaining user consent within the instance. The outputs of the scheduling module 1320, privilege selector 1330, and consent module 1340 are sent to a CTI Generator 1350 which generates an appropriate CTI to a user mobile device in accordance with the client's authentication parameters.

Figure 14:
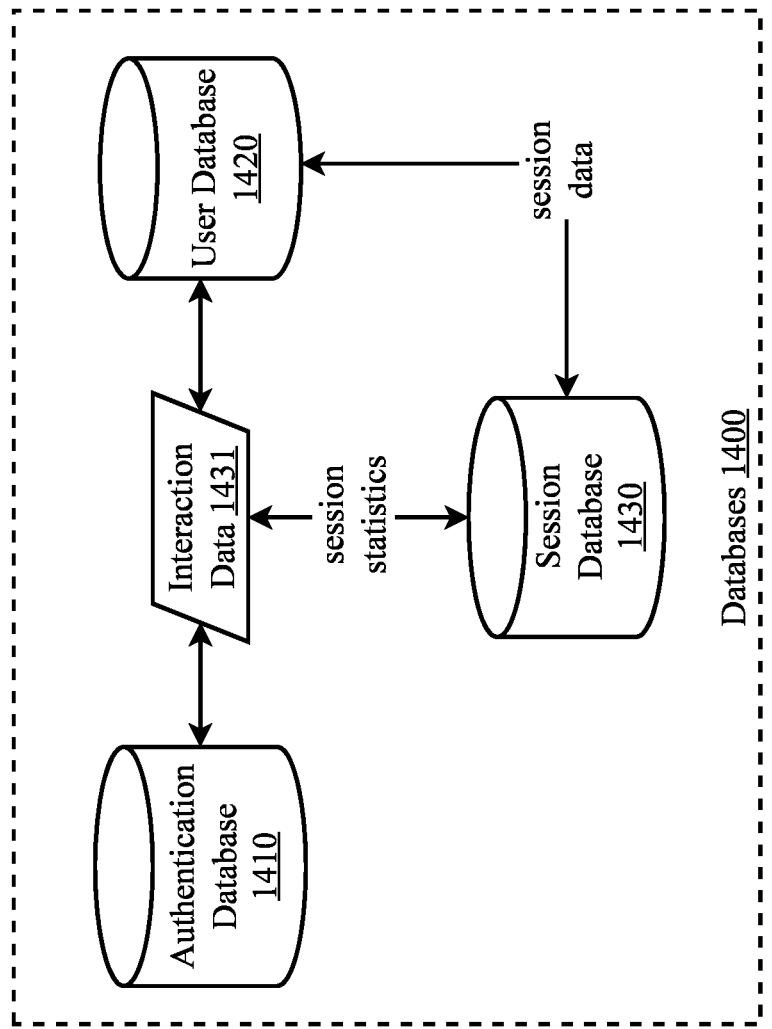
FIG. 14 is an exemplary set of databases for a universal identification and passport management system using a phone identifier and text redirect.

FIG. 14 is an exemplary set of databases for a universal identification and passport management system using a phone identifier and text redirect. The databases 1400 store authentication information, user information, and session information.

The authentication database 1410 comprises information about the client for facilitating identification between clients and users such as client credential requirements; instructions for authentication a user computing device; maps of authentication systems including access points and area restrictions; and additional authentication information such as time limitations, renewal allowances, and privilege requirements. The authentication database 1410 may be configured to store a plurality of authentication instructions including the associated authentication instructions for each authentication instance. In some embodiments, the authentication instructions specify a plurality of accesses that will be granted to the user computing device.

The authentication database 1410 may take the form of a managed or unmanaged database, document-oriented database system, or SQL database, or other suitable form of database. Examples of types of database software that may operate include MYSQL™ ORACLE DATABASE™, MONGODB™, and others. The authentication database 1410 may exist as a distinct physical device or be operating on another computing device that may perform other functions aside from operating, hosting and serving the authentication database 1410. If the authentication database 1410 is a distinct physical device, the database may be connected over a LAN or WAN, the Internet, a direct physical connection to another device, or some other network connection. The authentication database 1410 may be a centralized database system. The authentication database 1410 may be a distributed database system.

The user database 1420 comprises information about users for facilitating identification and communication between clients and user computing devices. This information is stored in a user identity profile. Each profile must include at least the user's phone number and device IMEI but may further include such information as the user's IP address, name, address, shipping address, billing information, contact information, user preferred contact method (e.g. mobile phone, e-mail), user previous interaction history, and user privileges granted on third-party client systems.

The session database 1430 comprises information about previous sessions for facilitating identification between clients and user computing devices, identifying authentication issues, optimizing client communications.

Interaction data 1431 may be generated from any interactions between clients and user computing devices, and may be stored in any of the three databases 1410-1430, as necessary.

Figure 15:
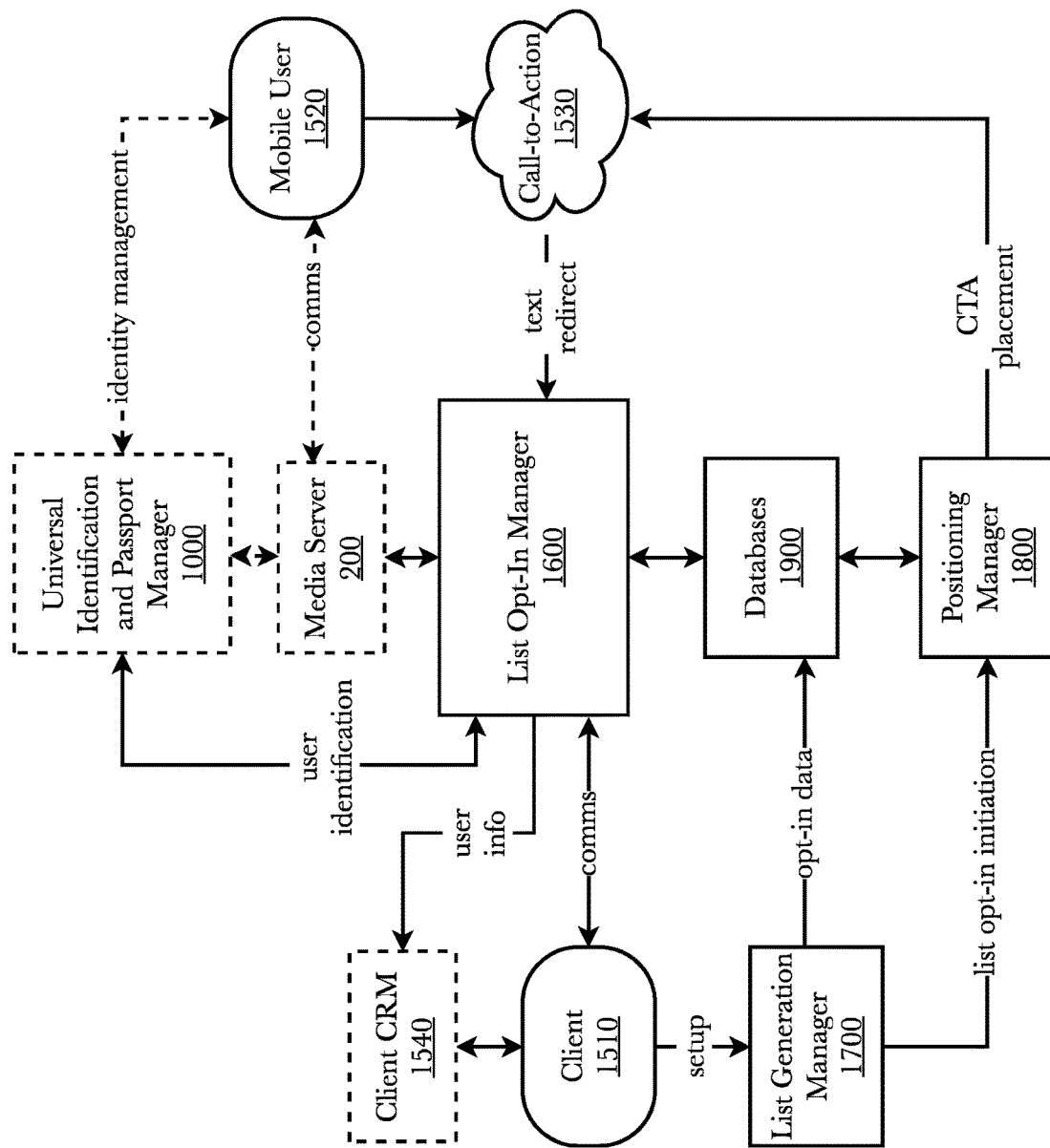
FIG. 15 is an exemplary system architecture of an automated opt-in list generation system using text redirect.

FIG. 15 is an exemplary system architecture of an automated opt-in list generation system using text redirect. In this exemplary embodiment, the system comprises a list opt-in manager 1600, a media server 200, a universal identification and passport manager 1000, a list generation manager 1700, a positioning manager 1800, and databases 1900. The system facilitates automated list opt-ins for mobile users 1520 with clients 1510 using calls-to-opt-in 1530. A client 1510 is any person, company, or organization building user, customer, or contact lists. A mobile user 1520 is any person using a mobile phone device to give consent (opt in) to add them to such a list. Identification and opt-ins between clients 1510 and mobile users 1520 are initiated by a mobile user's interaction with a call-to-action (CTA) 1530. A CTA 1530 means any design to prompt an immediate response or encourage a mobile user to initiate an opt-in process using the mobile user's device to provide identification and consent to be added to a list and contacted by the client 1510. For online and other digital CTAs (e.g., clickable buttons, links, scannable QR codes, etc.), the CTA 1530 will generally be generated and placed by the system in accordance with a client's 1510 list generation rules. However, non-electronic CTAs are also possible such as printed CTAs on printed receipts, print advertising materials, signage, or in-store displays.

The list opt-in manager 1600 acts as the connection interface between client 1510 and mobile user 1520, capturing the user's consent to be added to a list and consent to receive communications from a client, handling privacy screening or private connections between client and mobile users, and configuring user information for lists. The universal identification and passport manager 1000 may act as the identification interface between client and mobile user, providing the requested user information from a user's identity profile, although this function may be performed through alternate means such as by manual user input or open-sourced user information profiles. The user information may be outputted to a client's external CRM 1540 or stored in a list within a database 1900. The media server 200 may act as the communication channel interface between client and mobile user devices, passing various forms of communications media (emails, texts, traditional telephone, VOIP, etc.) between the devices, although communication may take place directly between a client and mobile users or through third-party communication channel interfaces. The list generation manager 1700 provides the client with an interface through which the client may create list generation instructions which may be dynamically adjusted based on feedback from mobile user interactions with CTAs and other information. The positioning manager 1800 creates list opt-in instances from an instruction, and automatically determines where and when to place CTAs for each list opt-in instance depending on automation, generation, and targeting goals. The databases 1900 store client information (list generation instructions, user information requests, user information formatting instructions, API integration with a client's external CRM, etc.) and user information.

Figure 16:
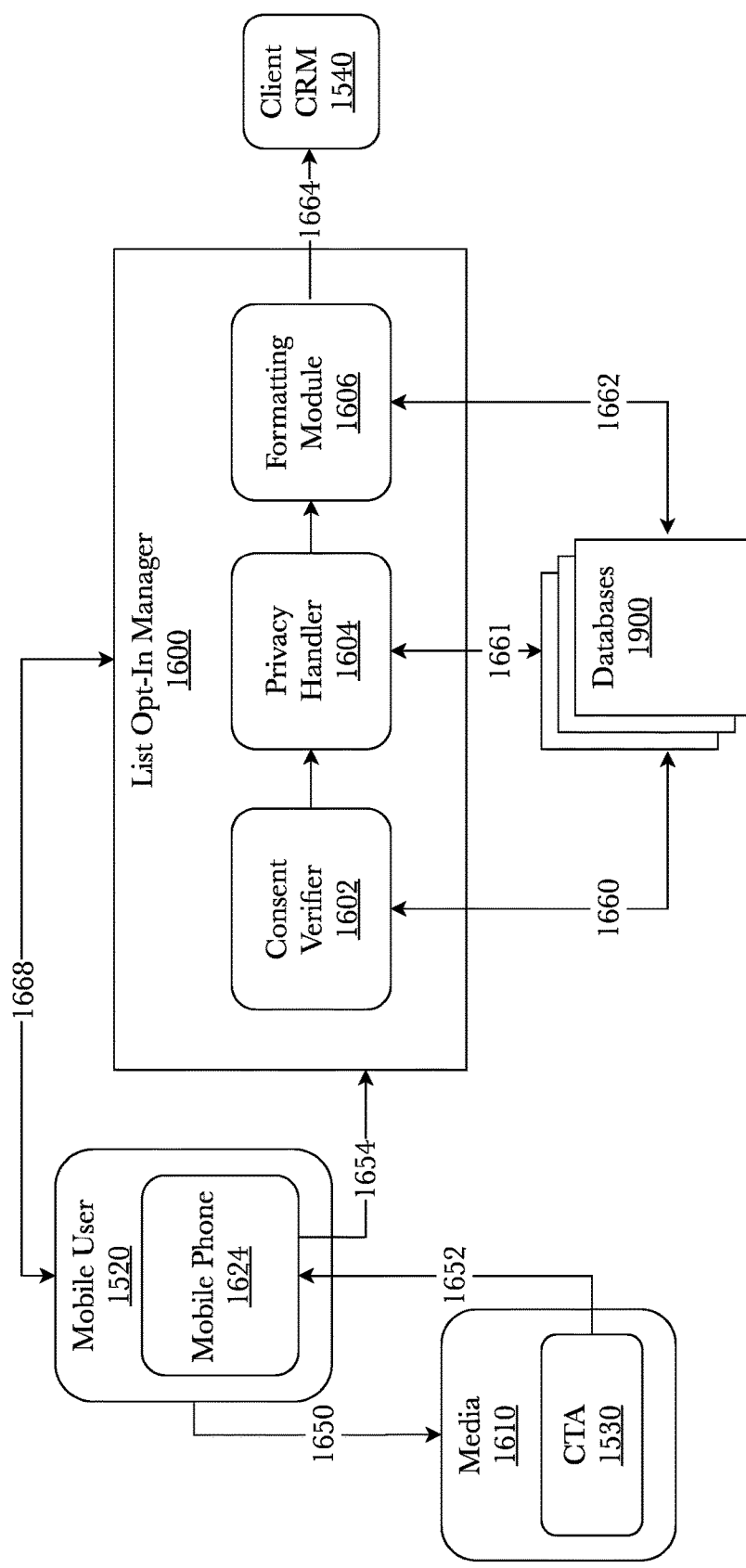
FIG. 16 is a block diagram illustrating an exemplary list opt-in manager aspect of an automated opt-in list generation system using text redirect.

FIG. 16 is a block diagram illustrating an exemplary list opt-in manager aspect of an automated opt-in list generation system using text redirect. List opt-in manager 1600 links to an initiating "call-to-action" (CTA) 1530 associated with a request for user identification and/or user information and user consent. A CTA 1530 may be embedded in media 1610 of various forms, a preferred form being a scannable QR code, however, other forms are anticipated including, but not limited to, a clickable button hosted on a website or a clickable link served via social media, website, or email which, on user interaction, triggers a text redirect, executing code to populate an SMS or MMS message on the user's mobile phone or device containing a list opt-in identifier.

Initialization of list opt-in manager 1600 comprises storing list opt-in instructions and user information, including user identity and contact information, in databases 1900 and everything related to the list opt-in (e.g., procedures, instructions, rules, criteria, initiator ID, unique identifier, user information formatting, CRM API authentication tokens, etc.) is called a procedure. The identifier may be autogenerated by an algorithm, or taken sequentially from a list, or other methods known to those in the art. Additionally, each procedure must have at least stored list opt-in instructions for formatting the requested information for a newly opted-in mobile user 1520 to be compatible with an existing list stored in a database 1900 or for export to or integration with 1064 a client CRM 1540. A CTA 1530 containing the unique identifier may be generated embedded in appropriate media 1610 for the client's list generation and user consent goals. A non-exhaustive list includes printed materials such as billboards, posters, and flyers; and electronic means including clickable buttons, advertisements, URLs, push notifications, etc.

With the list opt-in manager 1600 initialized, a mobile user 1520 will observe media 1610 containing a CTA 1530 and use a device particularly a mobile phone 1624 to engage 1650 with the media 1610 and trigger the CTA 1530, for example clicking a link located in a client's social media profile, which will cause the device 1624 to perform a text redirect by propagating a text message 1652 with destination and content including at least the identifier associated with the specific CTA instance, user consent, and user identity information. In one embodiment, the user identity information may be retrieved from a universal identity and passport management system using the unique identifier, user phone number, and user device international mobile equipment identity (IMEI) number). In another embodiment, the user identity information is provided by the user within the SMS or MMS or retrieved from a database 1900 using the user's phone number captured from the SMS or MMS and the user's IMEI added to the text message 1652. The mobile user 1520 need only press the send key/button to send the message 1654. The message sent 1654 is received by the list opt-in manager 1600 which logs at least the user's phone number. The data is first passed to a consent verifier 1602 which queries 1660 a client database 1900 using the identifier to return a specific set of list opt-in instructions 1660 containing the consent requested by the client to opt the mobile user into the client's list and communications. The consent verifier 1602 uses the returned data to verify that the SMS or MMS satisfies the consent procedure for list opt-in. In one embodiment, the list opt-in manager 1600 then passes the CTA and associated information to a privacy handler 1604 which queries 1661 a user information database to retrieve 1661 additional user information associated with the user's mobile phone number or IMEI and select only the user information for which the mobile user 1520 has given consent. In another embodiment, the privacy handler 1604 might submit a call for the requested user information to a universal identity and passport manager. The formatting module 1606 queries 1662 the database 1900 for formatting instructions and uses the returned instructions to format the user information to be sent 1664 to the client CRM 1540. In an embodiment, the list opt-in manager 1600 may contact 1668 the mobile user 1520 to request additional information not contained in a database 1900 or to notify 1668 the mobile user 1520 that they have been successfully added to the client's contact list.

In one example, interacting with the CTA opts a mobile user into a social media influencer's monthly email newsletter through a link posted by the influencer to their social media account or saved in their social media account profile, providing the influencer with the user's social media username and email address. In a second example, a mobile user clicks a link in a purchase confirmation email from a small business such as an Etsy seller to opt in to receive ongoing SMS notifications of sales events or special offers for future purchases. In a third example, a mobile user scans a QR code printed on the back of a physical event ticket, such as for a music show, to opt in to receive multi-channel marketing messages from the featured band. In a fourth example, a mobile user follows a musician on Twitter and automatically receives a direct message containing a link to opt in to be notified of an upcoming album release via SMS; clicking the link generates an SMS message for the user to send giving permission to opt the user in to the album release notification list and identified only by the user's Twitter username. In a fifth example, a mobile user scans a QR code on a poster to be added to a church's congregation list, where the mobile user's universal identity passport automatically provides the user's name, phone number, and address.

Figure 17:
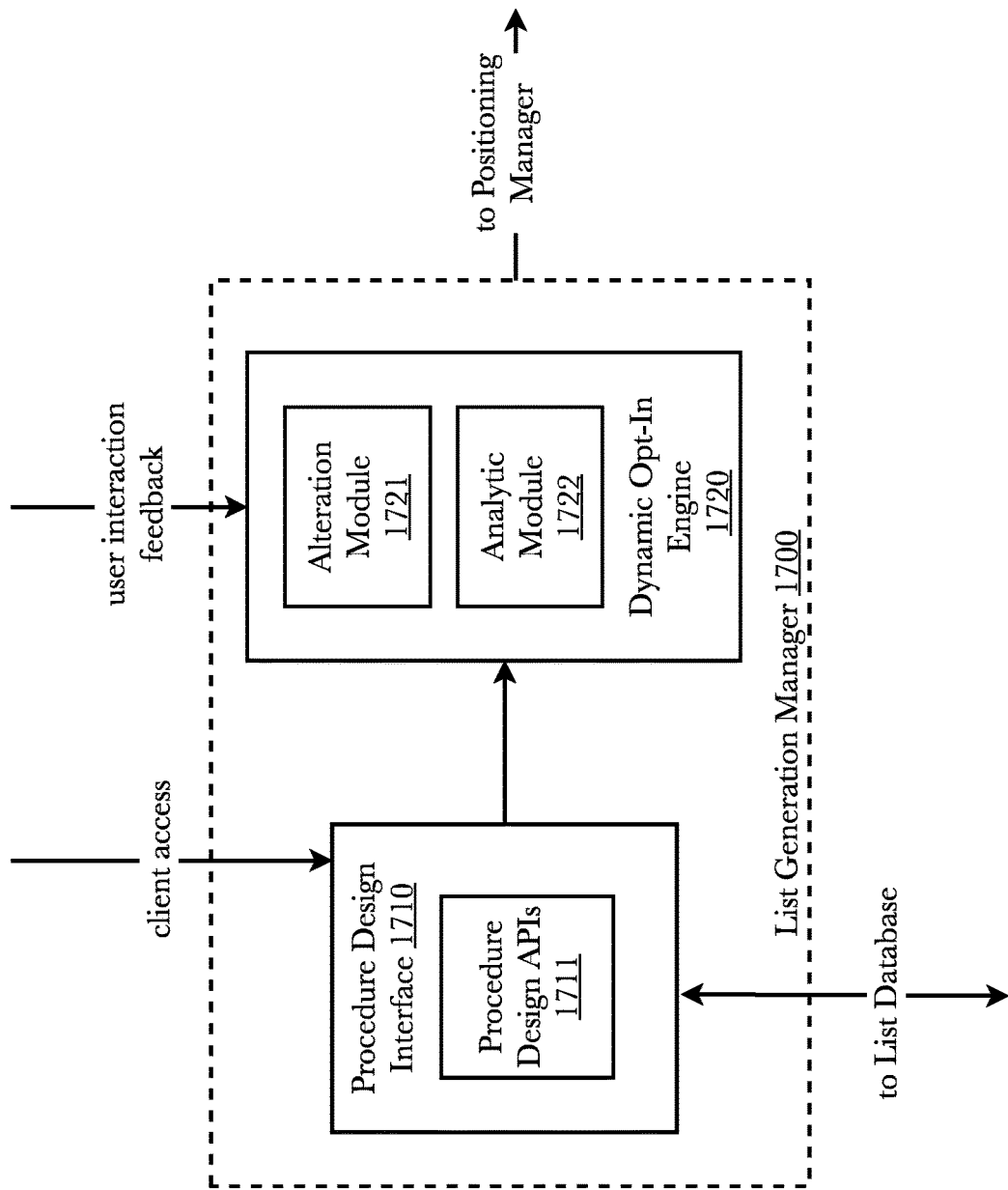
FIG. 17 is an exemplary list generation manager aspect of an automated opt-in list generation system using text redirect.

FIG. 17 is an exemplary list generation manager aspect of an automated opt-in list generation system using text redirect. This diagram is derived from the previous system architecture diagram of FIG. 26 of the parent application (63/319,314) and prior applications that have been incorporated herein by reference. The list generation manager 1700 provides the client with an interface through which the client may create automated opt-in procedures which may be dynamically adjusted based on feedback from user interactions with CTAs and other information. In this embodiment, the list generation manager comprises a procedure design interface 1710 and a dynamic opt-in engine 1720.

The procedure design interface 1710 comprises one or more procedure design APIs 1711 which allow clients to set up procedures comprising list generation instructions, opt-in criteria, consent ranges, user information requests, etc. Each procedure design API 1711 provides one or more aspects of the interface such as a graphical interface, requirements or instructions creation tools, criteria tools, etc., and the collection of the procedure design APIs 1711 allows the client to define complete list generation procedures, which are stored in the list database of the databases 1900.

Once a list generation procedure is created and implemented, the dynamic opt-in engine 1720 can be configured to make automatic changes to the procedures (or an aspect of a procedure) using alteration module 1721 based on feedback from interaction with CTAs and other information such as user opt-in actions, user consent variations, user information availability, etc. In some embodiments, opt-in variants may be generated manually or semi-autonomously with input or approval from the client. For example, dynamic opt-in engine 1720 may receive data associated with an opt-in procedure and analyze it, and based on the analytic data it may suggest an element of an opt-in to be altered by alteration module 1721, which can be automatically applied to the opt-in via the opt-in procedure data stored in the opt-in database 1910 or provided to the client for review and approval through the procedure design interface 1710.

A purpose of utilizing opt-in variants is to gather useful data about the efficacy, efficiency, and accuracy of a given opt-in and/or opt-in procedure. Implementing two similar opt-ins with the only difference between the two being a single element alteration (i.e., AB testing) can allow clients to understand how elemental choices for an opt-in affect user interaction. For example, an opt-in procedure for joining a sales notification list at an online retailer may be developed to enable clients to more optimally introduce opt-in requests within the mobile user shopping experience and a variant opt-in may be developed embodying the CTA in a different method or suggesting to the client a different timing of when to serve the CTA to the mobile user to suggest an opt-in. Both the baseline opt-in and the variant opt-in can then be deployed and user engagement data with both the baseline and variant can be monitored and analyzed to determine which of the baseline or the variant led to better outcomes for the user and client participating in list generation. In some embodiments, test plans may be received, retrieved, or otherwise obtained from list database 1910 by dynamic opt-in engine 1720 as an input into suggesting element alterations.

According to some embodiments, the analytic module 1722 may receive, retrieve, or otherwise obtain a plurality of data such as, but not limited to, details of interactions with CTAs, user engagement data, user dropout data, extent of consent given, and other data, and may process the plurality of data in order to determine the efficacy of a given generated list and/or opt-in procedure. In some embodiments, analytic module 1722 may received data pertaining to at least two lists or opt-ins comprising a baseline and a variant, and determine which of the two produced better results based upon analysis of the received data.

Figure 18:
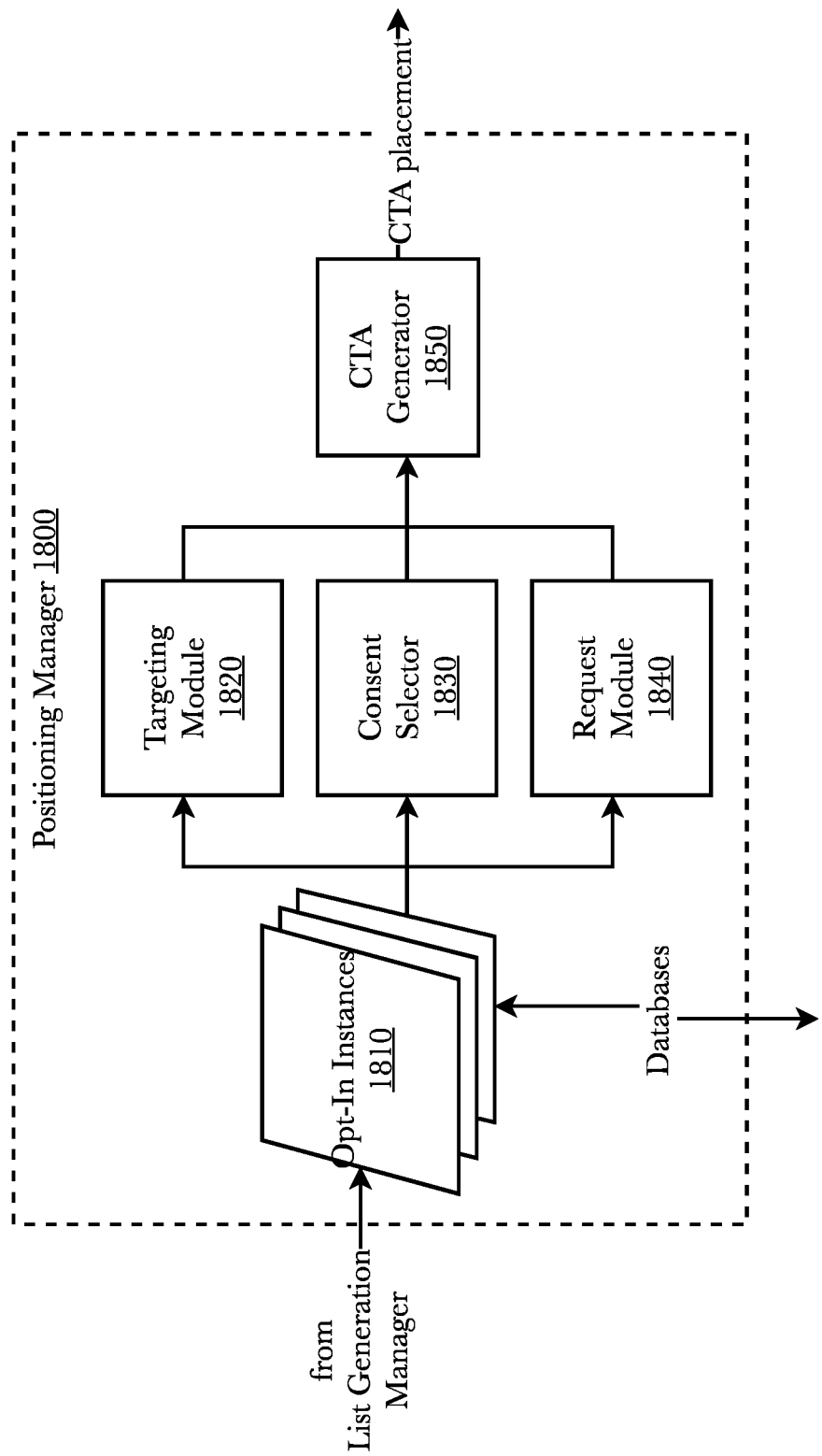
FIG. 18 is an exemplary positioning manager aspect of an automated opt-in list generation system using text redirect.

FIG. 18 is an exemplary positioning manager aspect of an automated opt-in list generation system using text redirect. In this embodiment, the positioning manager 1800 creates opt-in instances from a client's instructions, and automatically determines where and when to place CTAs for each opt-in instance depending on targeting, consent, and requested information goals.

The positioning manager 1800 receives notification of a list generation scheme or procedure from the list generation manager, retrieves relevant information about the generated list from the databases 1900, and creates one or more opt-in instances 1810 for implementation of the automated list opt-in. Not all lists will have multiple instances. Depending on the list configuration, each opt-in instance will represent some portion or division of the opt-in for implementation. For example, in an opt-in scheme for a social media influencer, instances may be generated for different social media accounts and platforms or based on interactable objects placed in advertising such as in a video spot, on the back of an event ticket or signed photograph, on an event banner, etc. Opt-in instances 1810 will typically have rules associated with targeting, consent, and requests for user information. In this embodiment, each instance is analyzed by a targeting module 1810 to identify targeting rules and constraints and output a target range, a consent selector 1830 to identify consent requirements and output a required minimum consent range, and a request module 1840 to identify user information requested for the instance and output requests for that information obtaining user consent within the instance. The outputs of the targeting module 1820, consent selector 1830, and request module 1840 are sent to a CTA generator 1850 which generates an appropriate CTA to a user mobile device in accordance with the client's list generation and opt-in parameters.

Figure 19:
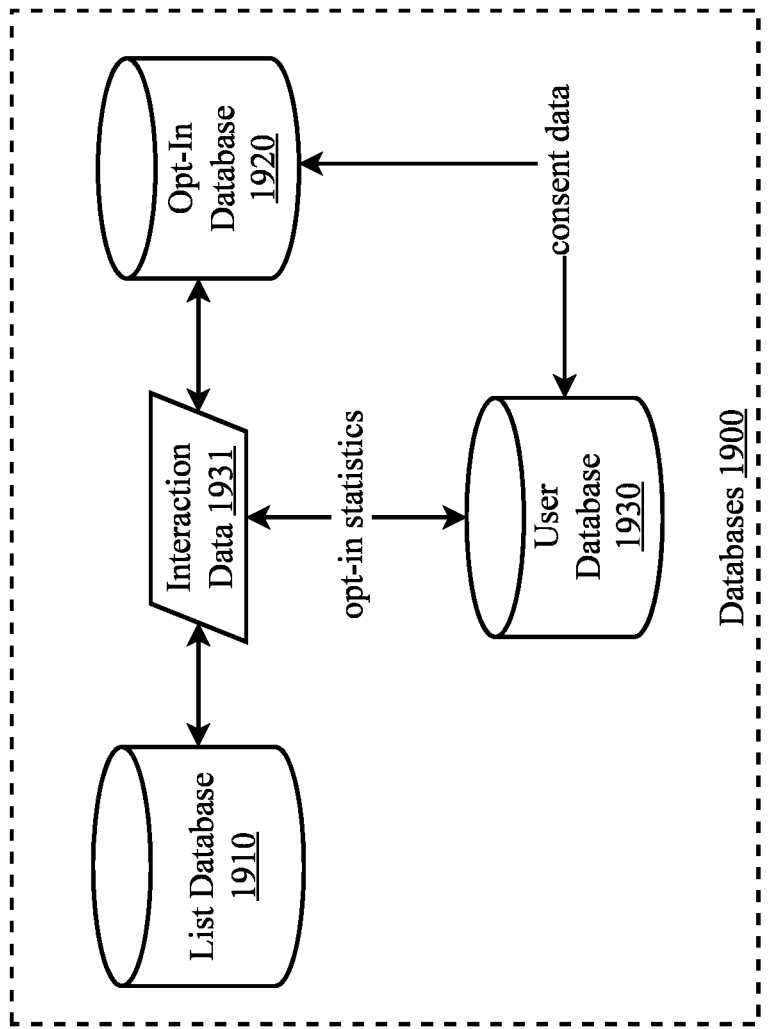
FIG. 19 is an exemplary set of databases for an automated opt-in list generation system using text redirect.

FIG. 19 is an exemplary set of databases for an automated opt-in list generation system using text redirect. The databases 1900 may store list information, opt-in information, and user information.

The list database 1910 comprises information about the client for facilitating list generation such as list purposes; list feeding channels; requested user information; list storage instructions; list export instructions; CRM API integration information and credentials; formatting instructions; and additional list information such as age limitations and banned user lists. The list database 1910 may be configured to store a plurality of list generation instructions including the associated opt-in instructions for each opt-in instance, which may further include a consent range and a procedure for identifying the range of user information a user has consented to provide and what information a user has chosen to keep private.

The list database 1910 may take the form of a managed or unmanaged database, document-oriented database system, or SQL database, or other suitable form of database. Examples of types of database software that may operate include MYSQL™, ORACLE DATABASE™, MONGODB™, and others. The list database 1910 may exist as a distinct physical device or be operating on another computing device that may perform other functions aside from operating, hosting and serving the list database 1910. If the list database 1910 is a distinct physical device, the database may be connected over a LAN or WAN, the Internet, a direct physical connection to another device, or some other network connection. The list database 1910 may be a centralized database system. The list database 1910 may be a distributed database system.

The opt-in database 1920 comprises information about user consent for being added to a list or enabling communication between clients and users. This information may be stored as a binary consent or non-consent, or as a range of consents across user information and communication methods.

The user database 1930 comprises information about users, such as social media usernames, names, phone numbers, addresses, purchase history, etc. User information may be provided by the user or by the client and may be updated to provide relationship and interaction history.

Interaction data 1931 may be generated from any interactions between clients and users, and may be stored in any of the three databases 1910-1930, as necessary.

Figure 20:
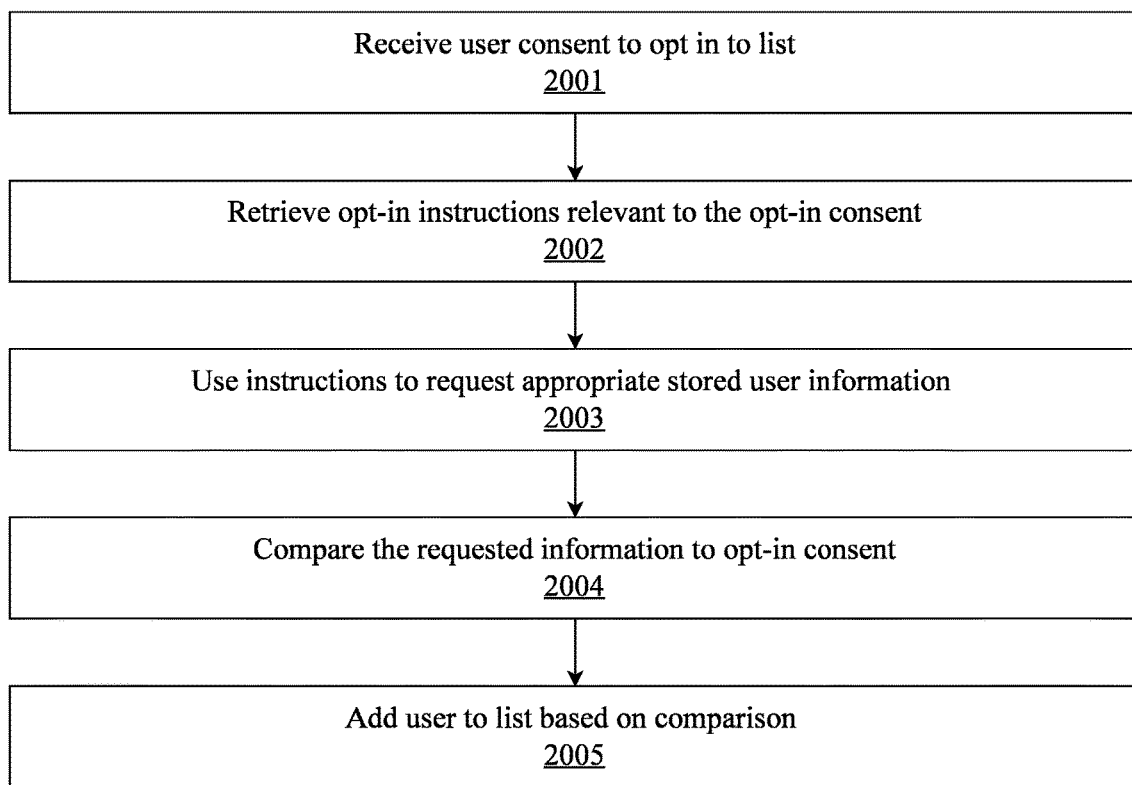
FIG. 20 is a flow diagram illustrating an exemplary method for generating an automated opt-in list using text redirect.

FIG. 20 is a flow diagram illustrating an exemplary method for generating an automated opt-in list using text redirect. The opt-in is initialized by providing a user with a mobile device some means by which they may initiate a communication related to opting in to a list the person is interested in. Such means may comprise a billboard with a phone number or a URL, or an advertisement in a retail store or magazine with a QR code, or may comprise an online advertisement that is selected or clicked by the user, among many other options and combinations. When the user interacts with the advertisement (e.g., goes to the URL, clicks on the advertisement, scans a QR code, etc.) a text message is auto-populated on the consumer's device. The means to produce both the content of the text message and the text message itself may happen in various ways. The content of the text message may be retrieved from the URL, or may be embedded within the QR code, or originate from the advertisement that was selected. As with the exemplary means in the previous statement, each means may also have a way to embed other contextual information for the purposes of opt-in satisfaction. This "other context" may include the time the interaction was initiated, geographic location, identifying information about the mobile device or user, advertisement matching information, and other data and metadata useful for such interactions. Once the text message and all of its content is populated on the user's device the user may simply tap the send button. The text message is then received by a service that facilitates a privacy compliant communication relevant to the advertisement/product/service. One example is when a user clicks an online advertisement to join an author's mailing list, information from the user's device and information contained by or retrieved by the CTA associated with the advertisement is used to auto populate the text message. The text message acts as a consent for opt-in, which, when received 2001, activates the retrieval of opt-in instructions 2002 related to the author's mailing list. The opt-in instructions are then used to request the appropriate stored user information 2003, which may include user identification information or user contact information. Once received, the requested user information is compared to the provided opt in consent 2004 contained within the instructions for how to opt in the user to the list. For example, a list may be age-restricted and require an additional age verification by the user to proceed. The user is added to the list based on the results of the comparison 2005.

Figure 21:
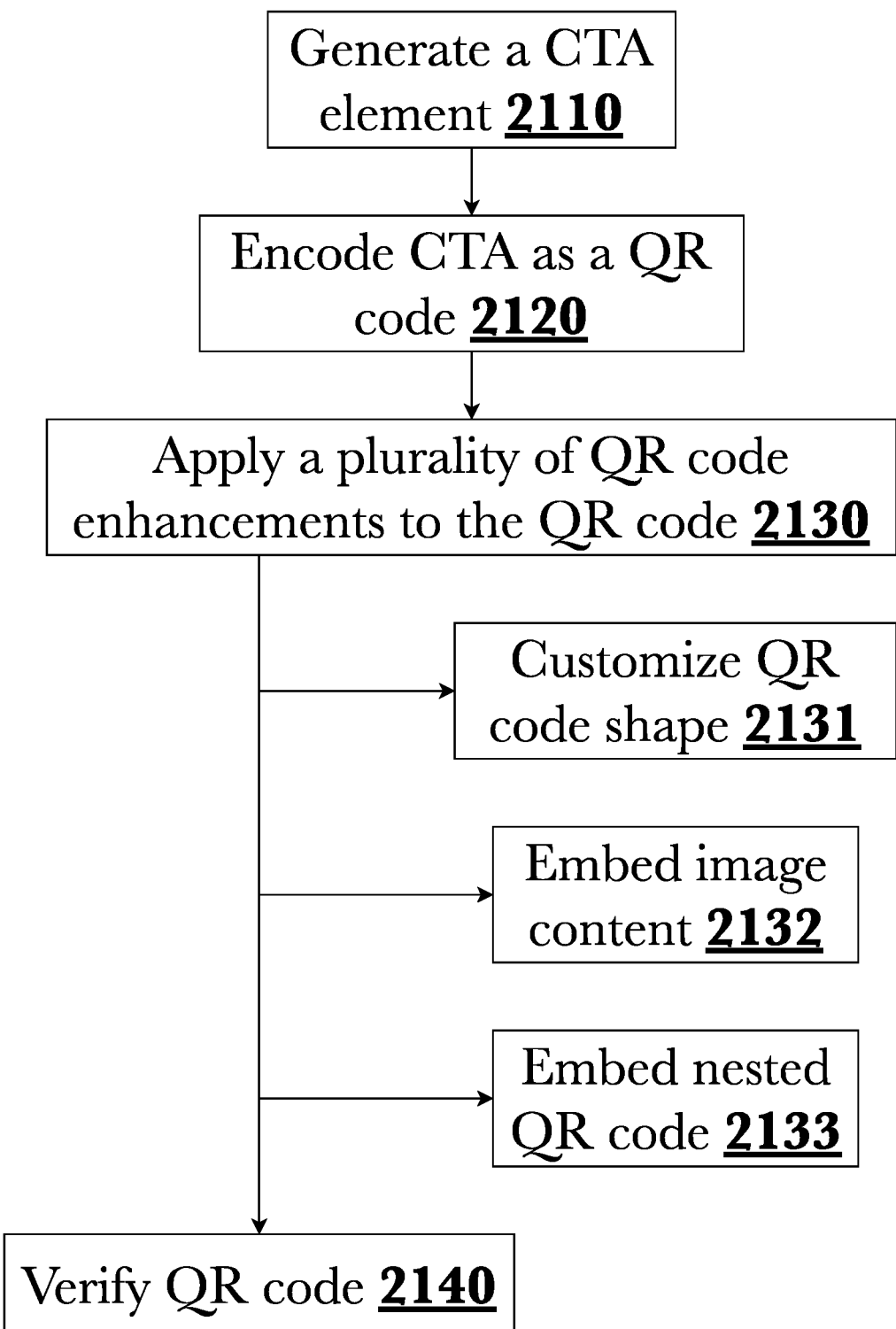
FIG. 21 is a flow diagram illustrating an exemplary method for generating and verifying a call-to-action as an enhanced QR code.

FIG. 21 is a flow diagram illustrating an exemplary method for generating and verifying a call-to-action as an enhanced QR code. Initially 2110, a CTA 1530 may be generated that comprises instructions or information such as (for example, including but not limited to) a uniform resource indicator (URI) that may be processed by a web browser or other software application. Generally, a URI is used to retrieve a webpage or formatted content that may trigger actions on a device, such as opening a text messaging application and pre-populating information within a message for a user to review and send. URIs may also comprise query fields that may be populated with information based on, for example, device hardware or software information such as a browser identifier, network connection, screen size, or other information that may be known by the device parsing the URI. The CTA instructions or content (such as a URI with query fields to provide device-specific information when scanned), may be encoded as a QR code 2120 by processing the text content of the CTA and translating it according to published QR code standards. For example, a standards-compliant QR code requires the use of a plurality of location indicators that a device camera uses to recognize the QR code from other image content within view, as well as a number of optional elements such as alignment indicators for larger QR codes to ensure accurate scanning (for example, when scanning a printed QR code from a page that may not be perfectly flat and perpendicular to a scanner lens). This produces a standard QR code comprising a two-dimensional (2D) array of visual elements that translates to the text content when scanned. To provide enhanced functionality, additional elements may then be incorporated 2130 into the QR code beyond what is required by a published standards specification, such as (for example, including but not limited to) the use of customized code shapes 2131, additional image content 2132, or the use of secondary embedded QR codes 2133 that may be placed within the enhanced QR code. Each of these enhancements may be used to provide additional data beyond what is possible with standard 2D encoding, and multiple elements may be combined as desired to achieve a particular CTQ result. Finally, a software-based QR code interpreter may be used to translate the resulting enhanced QR code to ensure proper function 2140, such as verifying that any desired data fields are populated in a URI, the formatting and content are correct, and parsing the URI produces the expected CTQ response.

Any number of QR codes and various instructions they comprise may be generated and optionally stored for future use or revision, and it thus is possible to maintain control over an already-published QR code through control of the database containing the CTA responses triggered by scanning the QR code. For example, a QR code comprising a URI that fetches web content (for example, such as a tailored web page designed to open a messaging application on a smartphone or other mobile device) may be modified by altering the web content that is served, without the need to change the encoded QR code content and publish a new code. By operating in a request-response arrangement, any number of QR codes may be published without need to update or modify their content in the future, and any changes may be performed at the database instead. This also provides functionality for disabling QR codes, or providing controlled access; for example, a QR code may comprise a URI that automatically submits certain device or user information with the request (for example, a device browser or operating system version). This user or device-specific information may be used when processing the URI and selecting web content to provide, such as to provide content that is compatible with a particular web browser application or operating system, or to provide specific content to certain devices or users while providing different content to others. This may be further expanded with any of a variety of advanced automation rules, such as scheduling rules that cause the behavior of a QR code to change based on date or time of day (for example, a QR code could provide special holiday content on certain days, or promotional content for a limited time), or rules that change the behavior of a QR code based not only on user or device information but on available third-party information that may be retrieved in response to a scan, click, or other interaction with the code.

Figure 22:
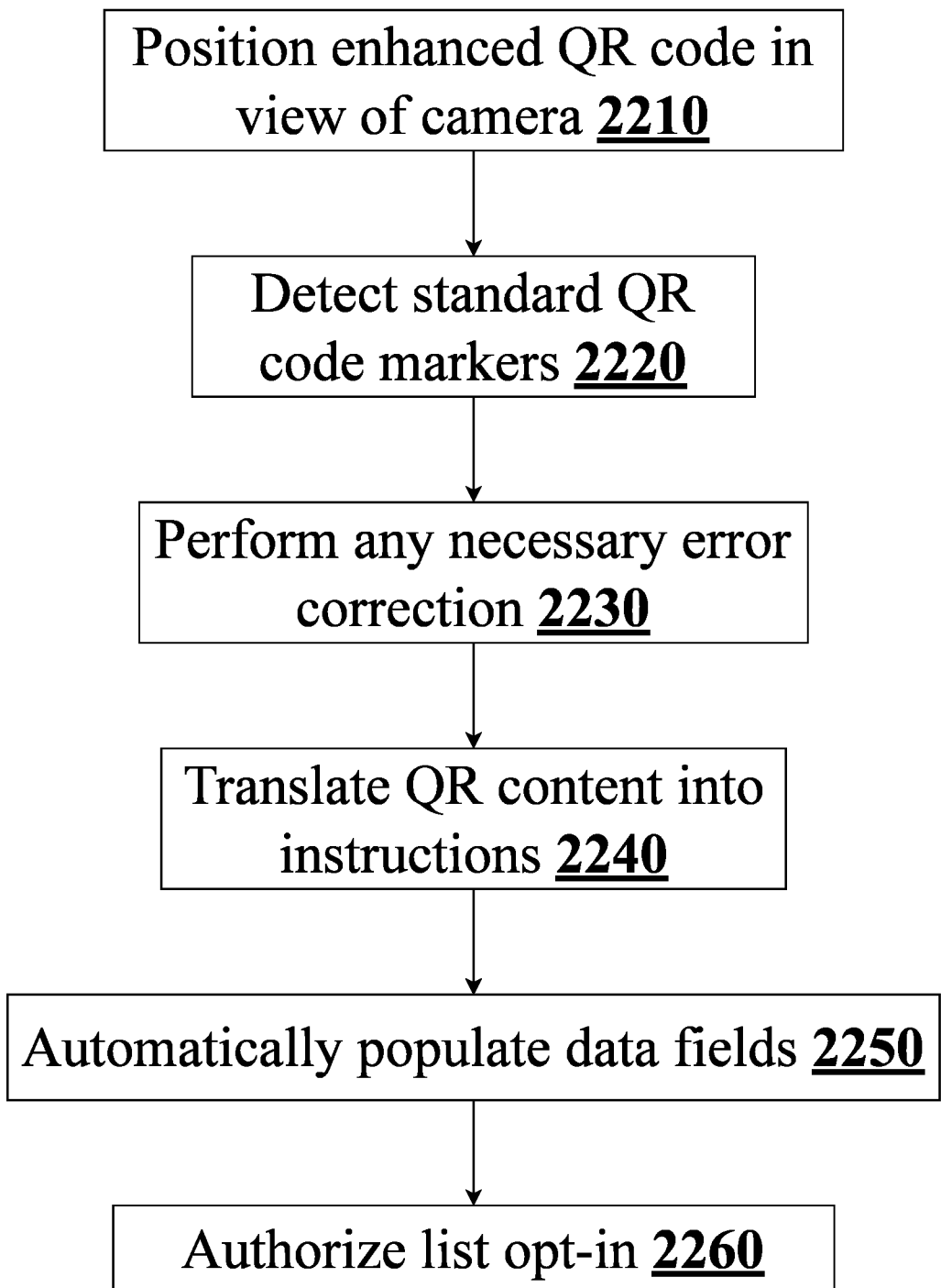
FIG. 22 is a flow diagram illustrating an exemplary method for scanning an enhanced QR code embodying a call-to-action.

FIG. 22 is a flow diagram illustrating an exemplary method for scanning an enhanced QR code embodying a call-to-action. When a user positions an enhanced QR code 2210 in view of their device camera, for example with a camera-enabled mobile device such as (for example, including but not limited to) a smartphone or tablet computing device, the camera software may recognize the QR code format from a plurality of standards-compliant elements 2220 such as location or alignment markers, as are specified in published standards specifications for QR codes. If the enhanced QR code utilizes a customized shape (that is, the encoded data takes a shape other than the standard square), the data may be read and processed normally using the embedded location and/or alignment markers; QR code standards specify certain measures in both the encoding and the reading of a code to account for damaged or obscured codes. If portions of the code are indeed damaged or obscured, such as a code printed on a wrinkled page or on a worn sign, the device may error-correct 2230 using embedded Reed-Solomon error correction codes that are specified as part of the QR code standards, ensuring the code is translated back into the correct text content without error. The content of the QR code may then be parsed 2240, for example opening an encoded URI in a web browser application on the device or executing instructions to perform any of a variety of actions. Information fields within an action or URI (for example, text fields in a message or email being generated, or query fields in a URI being parsed) that the device or browser may fill in automatically 2250, such as (for example) populating device hardware or software information, a timestamp, or data fields that may be populated using data in memory from any enhanced QR code elements that were scanned. For example, a URI field may be populated with information about an identified embedded image within an enhanced QR code, such as the name of a recognized individual. As another example, a URI may open a messaging application on the user's device and pre-populate information for sending a text message with specific content, such as (for example) a destination phone number or address, specific text fields such as a message title or body, or any other data that may be encoded within the QR code or retrieved in response to prompts or fields that are encoded. The consumer may then choose to authorize a list opt-in 2260, such as submitting a populated URI or sending a pre-populated text message, placing a phone call to a pre-populated number, or any other action that may be triggered on the mobile phone based on the content encoded within the scanned enhanced QR code.

Figure 23:
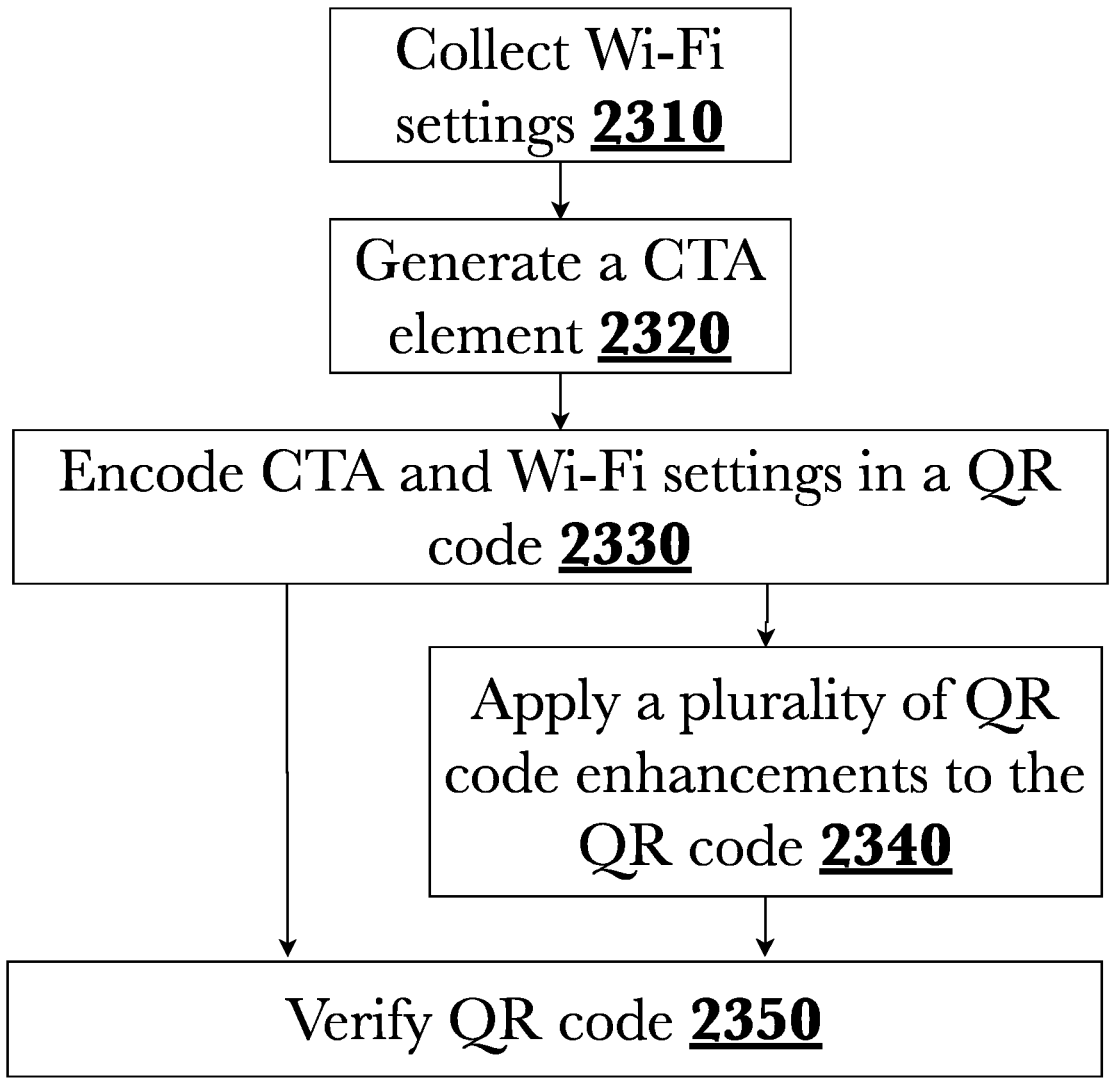
FIG. 23 is a flow diagram illustrating an exemplary method for generating and verifying a call-to-action with Wi-Fi connect as a QR code.

FIG. 23 is a flow diagram illustrating an exemplary method for generating and verifying a call-to-action with Wi-Fi connect as a QR code. Initially, Wi-Fi settings for a network are collected 2310. Settings could be collected from a device already set up on the network or loaded into a list generation manager 1700 by a client as an incentive to opt-in to a list, among other methods. A CTA 1530 may be generated 2320 as previously described. The CTA 1530 and the collected Wi-Fi settings are encoded together in a QR code 2330, which may include instructions to automatically connect to the network using the settings or to save the settings, enabling the user device to automatically recognize the network and connect during repeat business. QR codes can be generated in a range of ways, including by a positioning manager 1800 within a larger system. Optionally, a plurality of QR code enhancements as previously described may be applied to the QR code 2340. Finally, a software-based QR code interpreter may be used to translate the resulting enhanced QR code to ensure proper function 2350, such as verifying that any desired data fields are populated in the opt-in SMS and that the Wi-Fi connection succeeds. For example, a trade show may generate a QR code to register or check-in attendees. During the registration or check-in process, attendees can scan the QR code to verify their identity, which could be done by auto-populating an SMS or MMS with their name or email address and sending the auto-populated SMS or MMS to a trade show device for manual verification or to a destination received by a universal identification and passport manager 1000. After opt-in, attendees could receive SMS-based communications from the trade show, such as event app installation information, PDF or other downloads, or an event map image, to name some possibilities. In another example, individual vendors at a convention could generate a QR code to display at their booth which opts-in attendees to receive that vendor's event materials and automatically connects to the wi-fi network, if not already connected.

Figure 24:
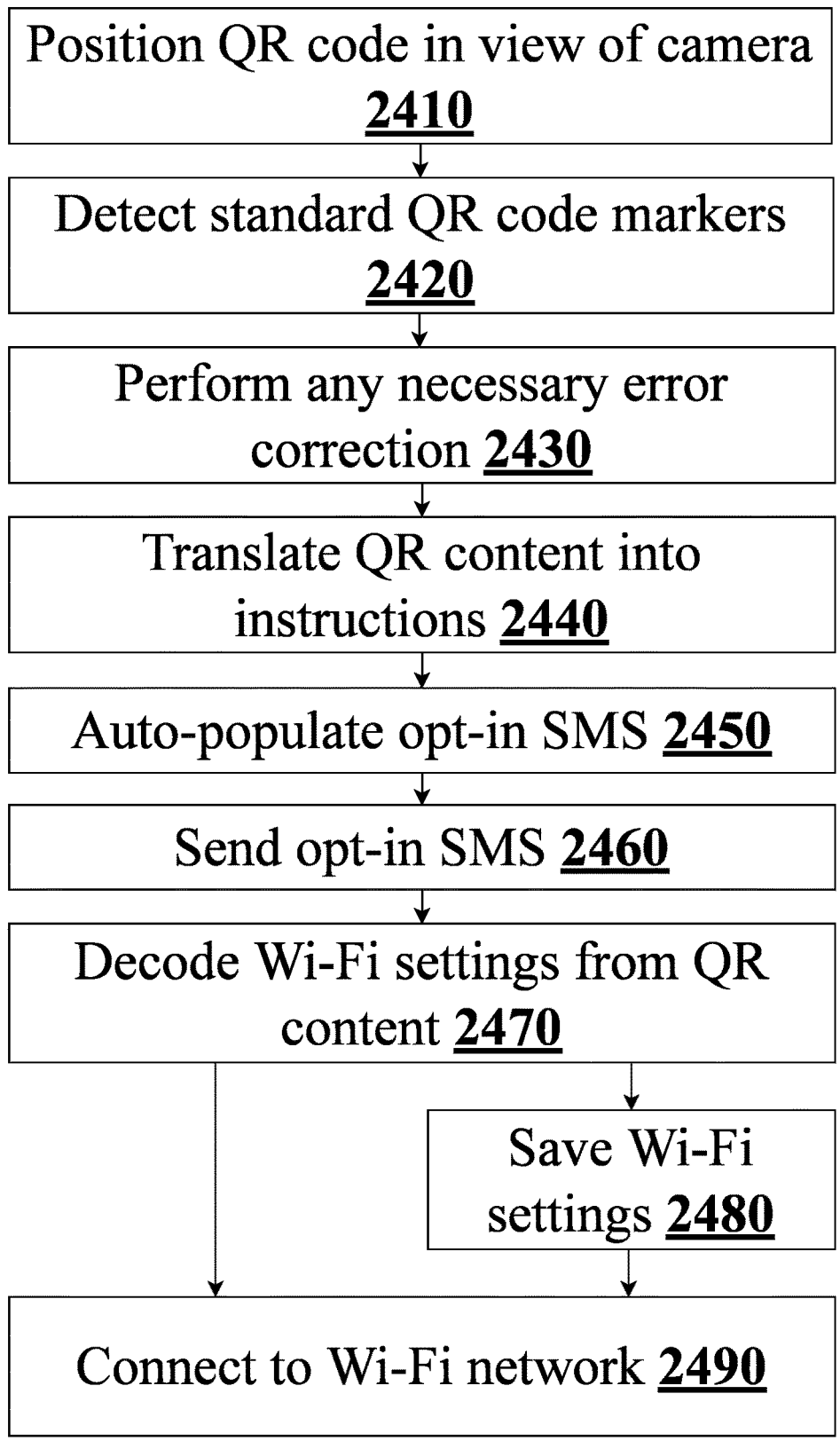
FIG. 24 is a flow diagram illustrating an exemplary method for opting in and automatically connecting to Wi-Fi by scanning a QR code.

FIG. 24 is a flow diagram illustrating an exemplary method for opting in and automatically connecting to Wi-Fi by scanning a QR code. When a customer positions a QR code 2410 in view of their device camera, the camera software may recognize the QR code format from a plurality of standards-compliant elements 2420 such as location or alignment markers, as are specified in published standards specifications for QR codes. If the enhanced QR code utilizes a customized shape (that is, the encoded data takes a shape other than the standard square), the data may be read and processed normally using the embedded location and/or alignment markers; QR code standards specify certain measures in both the encoding and the reading of a code to account for damaged or obscured codes. If portions of the code are indeed damaged or obscured, such as a code printed on a wrinkled page or on a worn sign, the device may error-correct 2430 using embedded Reed-Solomon error correction codes that are specified as part of the QR code standards, ensuring the code is translated back into the correct text content without error. The content of the QR code may then be parsed 2440, for example opening an encoded URI in a web browser application on the device or executing instructions to perform any of a variety of actions. Information fields within an action or URI (for example, text fields in a message or email being generated, or query fields in a URI being parsed) that the device or browser may fill in automatically 2450, such as (for example) populating device hardware or software information, a timestamp, or data fields that may be populated using data in memory from any enhanced QR code elements that were scanned or auto-populating an SMS message containing at least an identifier to opt-in to receive communications from the business, join a mailing list, create a rewards profile with the business, or consent to network usage tracking while on the network, among other possibilities. For example, a URI field may be populated with information about an identified embedded image within an enhanced QR code, such as the name of a recognized individual. As another example, a URI may open a messaging application on the user's device and pre-populate information for sending a text message with specific content, such as (for example) a destination phone number or address, specific text fields such as a message title or body, or any other data that may be encoded within the QR code or retrieved in response to prompts or fields that are encoded. The customer may then choose to send the auto-populated opt-in SMS 2460 to a destination, such as the business's CRM 1540 or an opt-in manager 1600 among other possibilities. The customer's device, continuing the translated QR instructions, decodes the Wi-Fi settings 2470 and, optionally, may save the Wi-Fi settings 2480 to its known network list before or after connecting to the network 2490. In one example, a customer device such as a smartphone is used to scan a QR code, executing instructions to the device's network drivers to connect to the network matching the Wi-Fi settings contained in the instructions. In a different example, a customer device such as a vendor laptop with an integrated or connected webcam scans a QR code with instructions to auto-configure the laptop's network interface card (NIC) to recognize the network and automatically connect. Other embodiments may include additional instructions to validate the network connection only during the session with subsequent sessions requiring another opt-in (i.e., the device is instructed not to save the network settings), to cause the customer device to begin talking to another device already connected to the network, and other such instructions. Other instructions may be added governing customer access, such as a time limit before disconnecting from the network, an activity requirement which if not met causes the device to disconnect from the network, or a geolocation fence which when triggered causes the device to automatically disconnect from the network. In one embodiment, the QR code may contain instructions connecting the customer device to a session managed by a session manager 1100, which may manage session interactions as previously described. For example, a fan attending a sporting event may scan a QR code on entry, or a QR code on the back of their seat, or a QR code printed on a physical ticket while the fan is present at the location to identify themselves, such as using a universal identity profile, and connect to the Wi-Fi network serving the fan's seating section. If the fan gets up to use a restroom, purchase food or memorabilia, or otherwise leave their section, the session manager 1100 can interface with the stadium's auto-configured network, such as a mesh or other topology, to manage the fan's network access. The session manager can terminate the session unilaterally, such as when the fan's device exits the stadium, after a designated time period, or on manual shut-off following an event without a scheduled end time.

Figure 25:
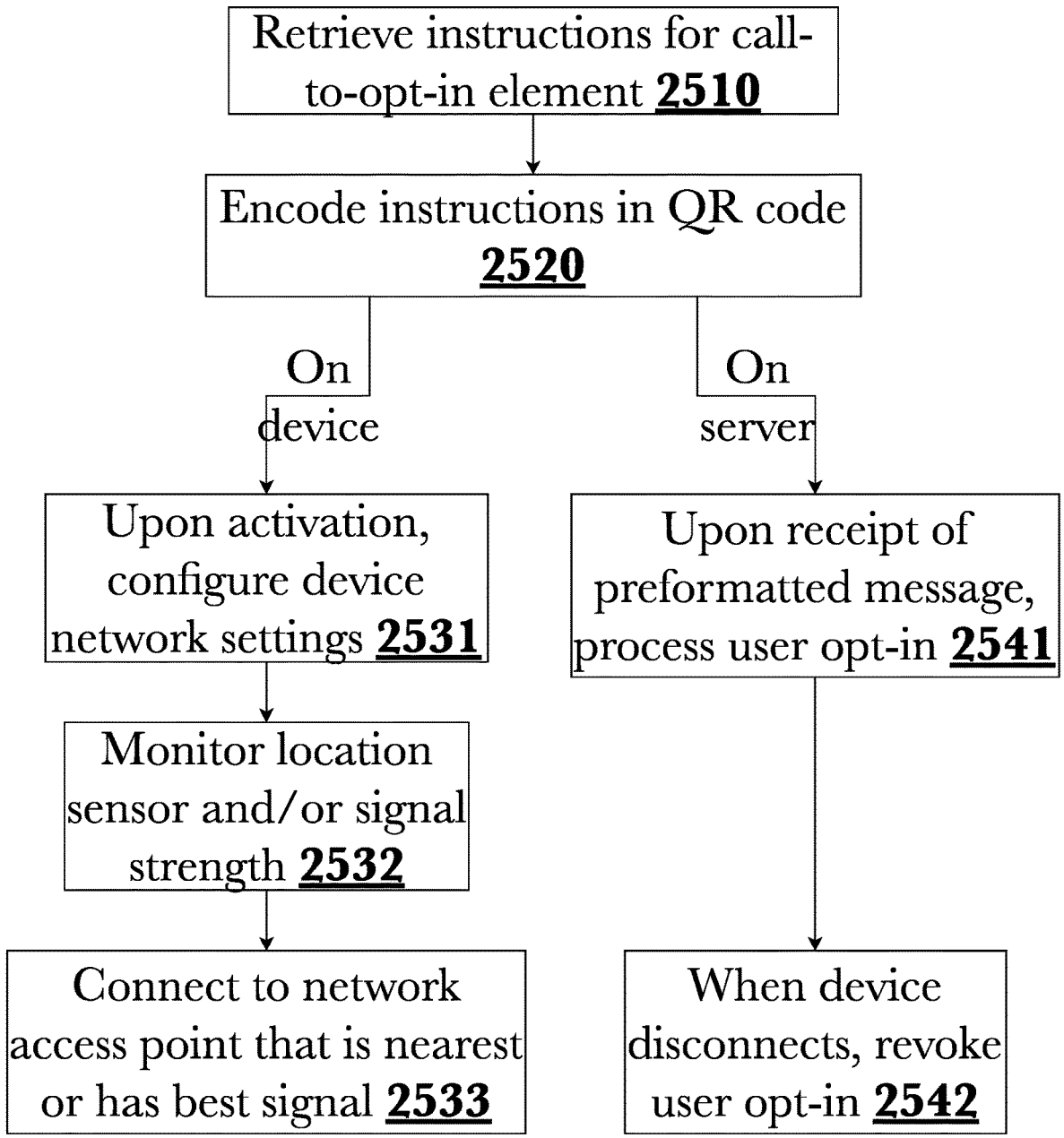
FIG. 25 is a flow diagram illustrating an exemplary method for combining Wi-Fi connection with location-based services via a call-to-action.

FIG. 25 is a flow diagram illustrating an exemplary method for combining Wi-Fi connection with location-based services via a call-to-action. In an initial step 2510, instructions may be retrieved from a database for encoding as a QR code 2520, for example as described above with reference to FIG. 23. The instructions may comprise not only network configuration settings as described above, but instructions for processing location-based information on both a user device as well as a server operating any of the text redirect systems or methods described herein.

On a user device, when a user activates a CTA the instructions may direct their device to configure network settings 2531 to connect to a Wi-Fi or other network automatically, for example to connect to a network at a venue such as a store, restaurant, sports event center, or other location that may provide a network for customers or attendees to use on their personal devices. The received instructions may further specify location-based rules for additional behaviors, causing the user device to monitor any available location sensors (for example, including but not limited to GPS, GLONASS, gyroscope, accelerometer, or other hardware sensors that may provide insight into the device's physical location or movement) or signal strength for the configured network 2532. Using this location-based information, the device may dynamically reconnect to the nearest network access point 2533, or that which has the strongest signal based on signal measurements, allowing the user to move freely while maintaining connection to the configured network.

On a server, a user opt-in may be processed 2541 upon receipt of a preformatted SMS or MMS message, as describe previously (with reference to at least FIG. 23). In addition, the instructions associated with the CTA from which the user sent the opt-in may further comprise instructions for handling an implicit user opt-out, enabling a closed-loop operation in which the user's implied consent may be constrained to defined rules based on the encoded instructions. In the currently-described arrangement, a user moving about within a configured network may leave the network area, such as exiting a venue at which they activated the CTA and connected to the local network. When the server detects that the user device is no longer connected, such as when the user leaves the venue or turns their device off, the user opt-in may be revoked automatically 2542, effecting an automated user opt-out process that prevents any open-ended opt-ins from persisting beyond their intended scope.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 26:
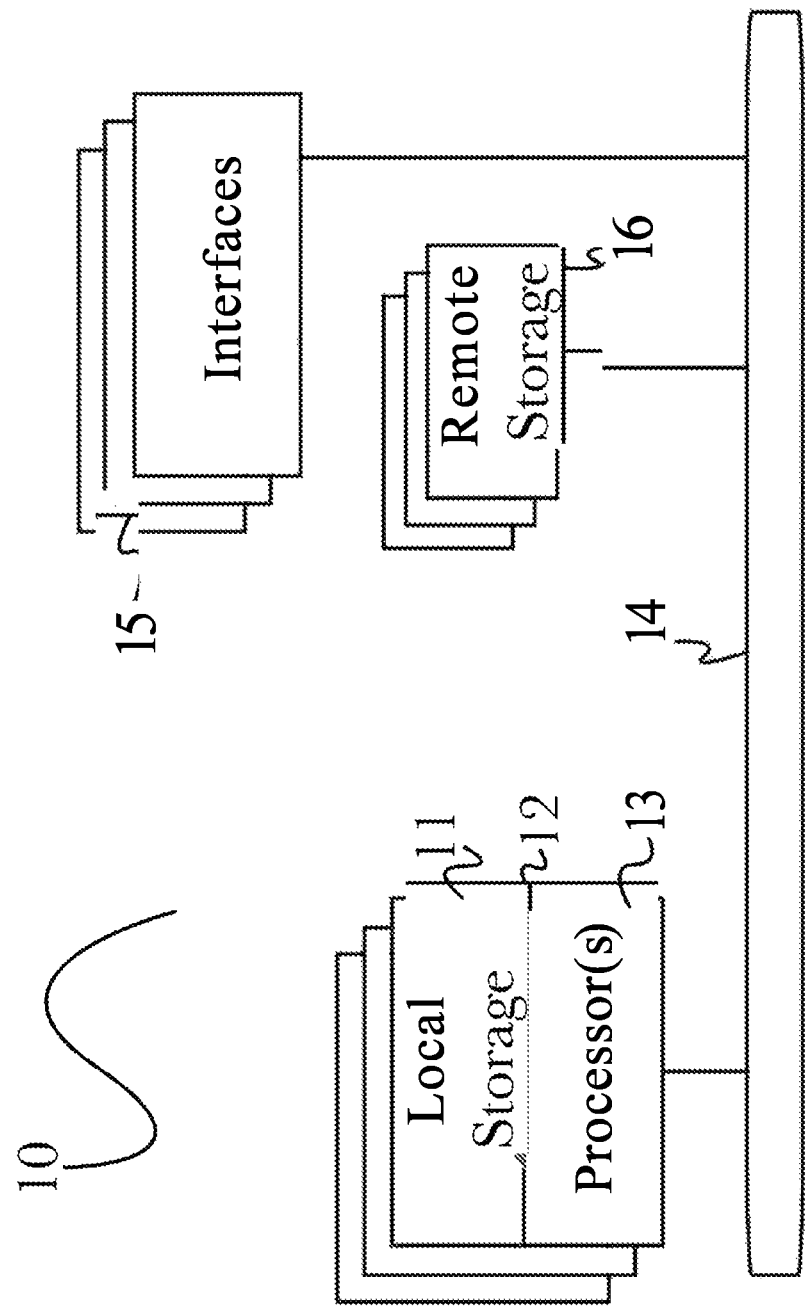
FIG. 26 is a block diagram illustrating an exemplary hardware architecture of a computing device.

Referring now to FIG. 26, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (Wi-Fi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 26 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably.

Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 27:
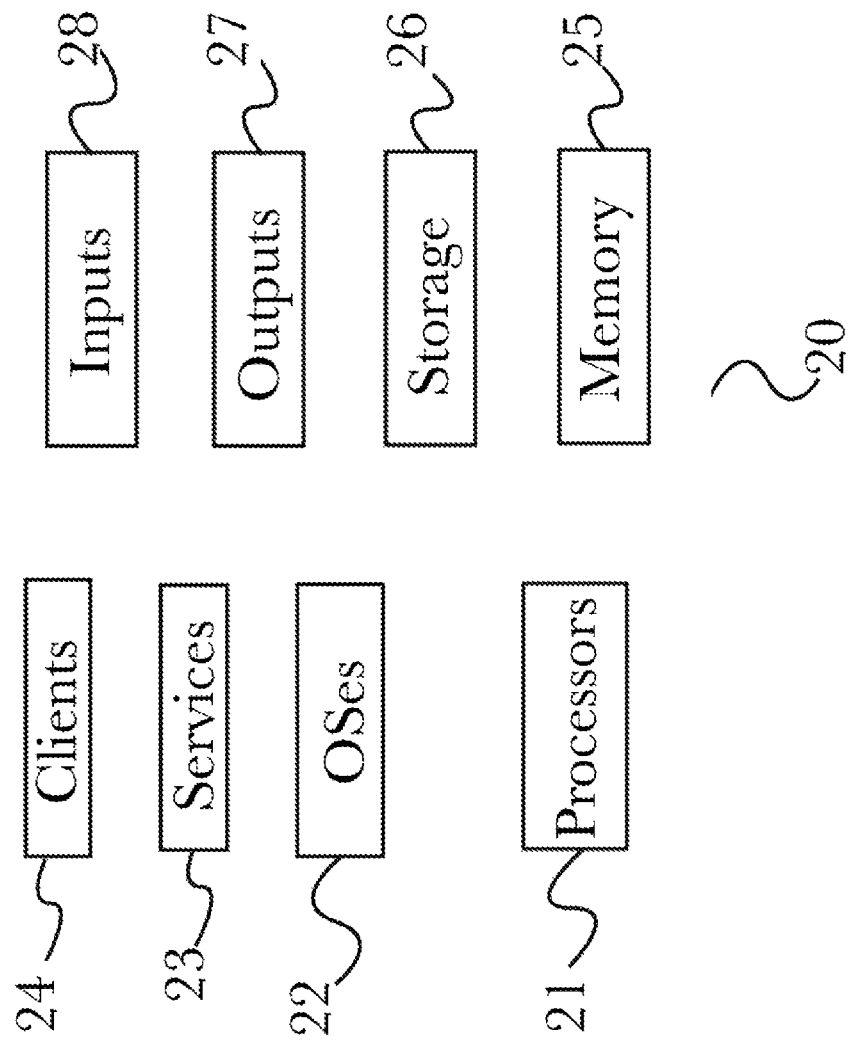
FIG. 27 is a block diagram illustrating an exemplary logical architecture for a client device.

In some aspects, systems may be implemented on a standalone computing system. Referring now to FIG. 27, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 26). Examples of storage devices 26 include flash memory, magnetic hard drive, CD-ROM, and/or the like.

Figure 28:
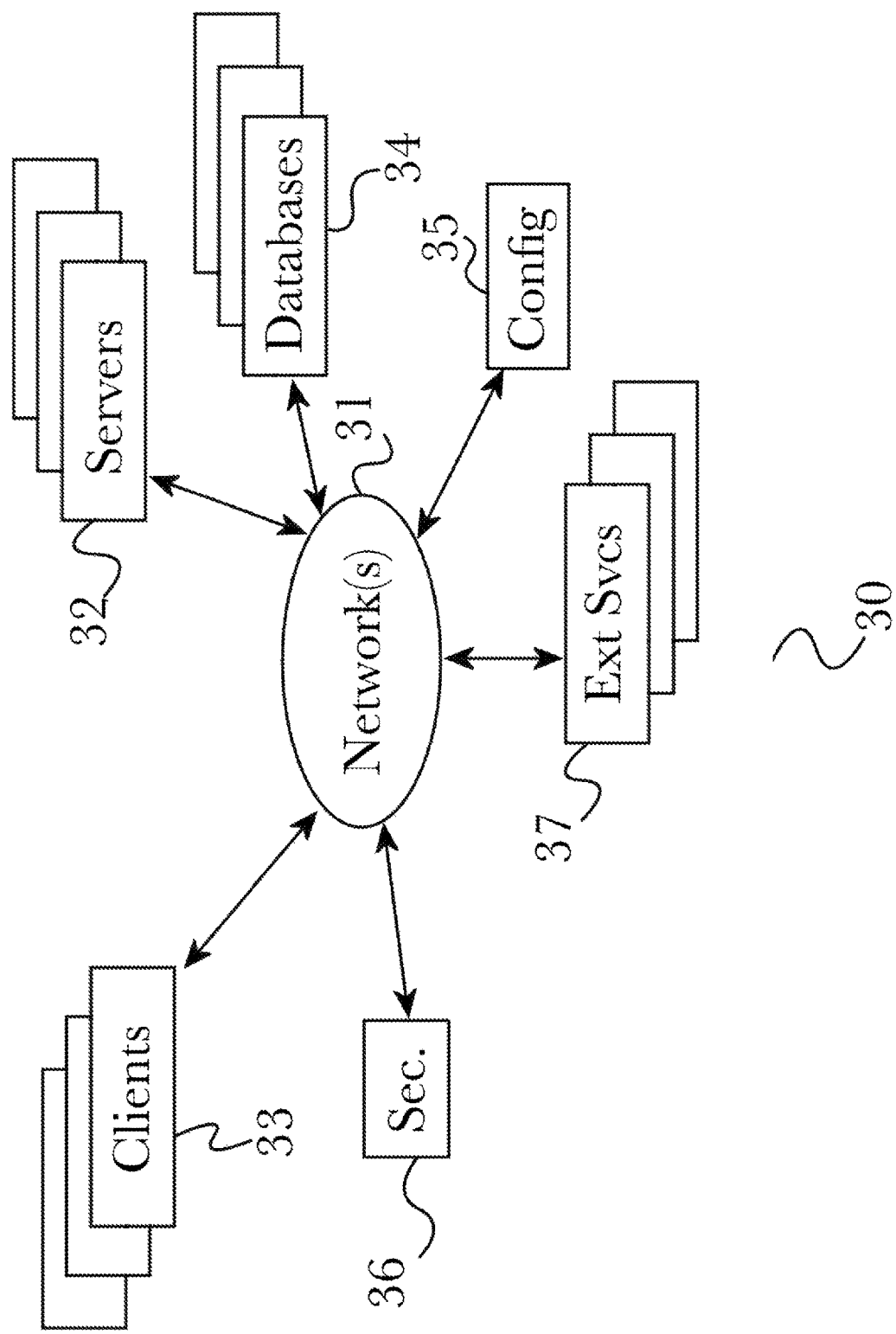
FIG. 28 is a block diagram showing an exemplary architectural arrangement of clients, servers, and external services.

In some aspects, systems may be implemented on a distributed computing network, such as one having any number of clients and/or servers. Referring now to FIG. 28, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 26. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as Wi-Fi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system or approach is specifically required by the description of any specific aspect.

Figure 29:
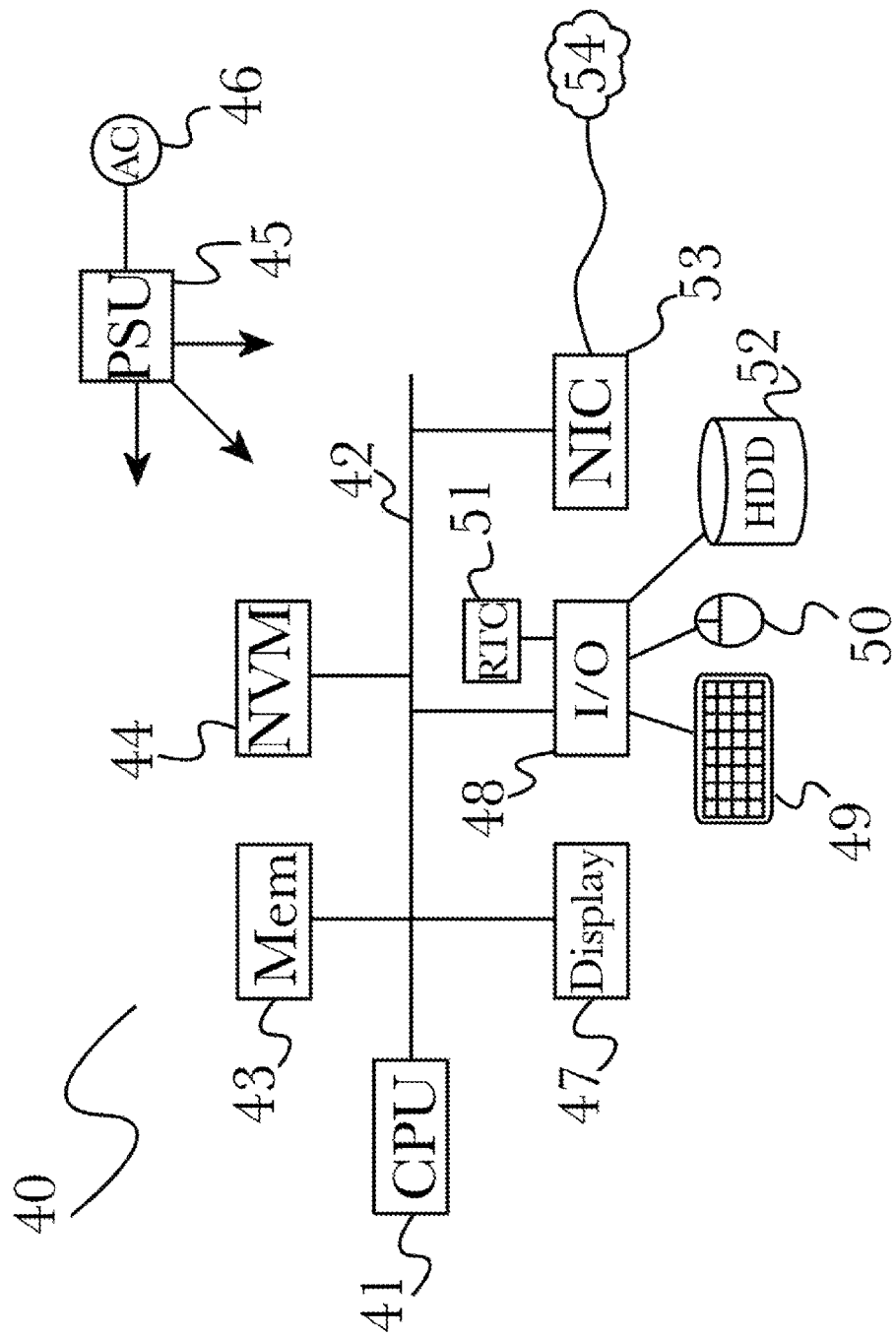
FIG. 29 is another block diagram illustrating an exemplary hardware architecture of a computing device.

FIG. 29 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents for integrating automatic wi-fi setup following customer opt-in using text redirect.

What is claimed is:

1. A system for automated Wi-Fi setup on integrated opt-in via text redirect, comprising:
    a computing device comprising a memory, a processor, and a non-volatile data storage device;
    a database stored on the non-volatile data storage device, comprising a plurality of client instructions, each client instruction of the plurality of client instructions comprising a scheme for generating placement of call-to-action elements, formatting instructions, and a consent procedure for verifying user consent to opt in;
    wherein an opt-in is a user's affirmative consent, provided via a text message, to participate in an automated Wi-Fi setup process;
    a messaging manager comprising a first plurality of programming instructions stored in the memory which, when operating on the processor, causes the computing device to:
        retrieve a client instruction from the database;
        generate a call-to-action element comprising enhanced coding that includes both opt-in instructions and network configuration data encoded together, wherein the enhanced coding is configured to generate a pre-filled short message service (SMS) or multi-media message service (MMS) message comprising a destination and an identifier, such that a single user interaction with the call-to-action element simultaneously initiates both the text message opt-in process and provides network setup information to the user computing device, causing the user computing device to populate the pre-filled SMS or MMS message with a user opt-in;
        receive the pre-filled SMS or MMS message containing the user opt-in, wherein the user opt-in is received specifically via a text message sent by the user in response to the pre-filled SMS or MMS message;
        retrieve a plurality of client instructions from the database, the client instructions being selected based on the user opt-in; and
        execute the retrieved plurality of client instructions to perform the automated Wi-Fi setup process as a continuous automated sequence without further user input after receiving the single text message opt-in, wherein executing the retrieved plurality of client instructions comprises:
            identifying available Wi-Fi networks in proximity to the user computing device;
            automatically selecting an optimal network based on predefined criteria including signal strength and security protocols;
            retrieving saved Wi-Fi credentials associated with the user's account;
            automatically inputting the credentials to connect the user computing device to the selected network; and
            sending a confirmation message to the user computing device upon successful connection to the Wi-Fi network.

2. The system of claim 1, wherein the coding instructions comprise network connection settings for the user computing device.

3. The system of claim 2, wherein the network connection settings comprise network roaming instructions.

4. The system of claim 3, wherein the network roaming instructions comprise network disconnect instructions.

5. The mobile device of claim 4, wherein the client instructions further comprise a user opt-out that is based on the network disconnect instructions.

6. The system of claim 2, wherein the network connection settings comprise connection information for a Wi-Fi network.

7. The system of claim 2, wherein the network connection settings comprise connection information for a mesh network.

8. A method for automated Wi-Fi setup on integrated opt-in via text redirect, comprising the steps of:
    wherein an opt-in is a user's affirmative consent, provided via a text message, to participate in an automated Wi-Fi setup process;
    retrieving, at a messaging manager, a client instruction from a database;
    generating a call-to-action element comprising enhanced coding that includes both opt-in instructions and network configuration data encoded together, wherein the enhanced coding is configured to generate a pre-filled short message service (SMS) or multi-media message service (MMS) message comprising a destination and an identifier, such that a single user interaction with the call-to-action element simultaneously initiates both the text message opt-in process and provides network setup information to the user computing device, causing the user computing device to populate the pre-filled SMS or MMS message with a user opt-in;
    receiving the pre-filled SMS or MMS message containing the user opt-in, wherein the user opt-in is received specifically via a text message sent by the user in response to the pre-filled SMS or MMS message;
    retrieving a plurality of client instructions from the database, the client instructions being selected based on the user opt-in; and
    executing the retrieved plurality of client instructions as a continuous automated sequence without further user input after receiving the single text message opt-in, wherein executing the retrieved plurality of client instructions comprises:
        identifying available Wi-Fi networks in proximity to the user computing device;
        automatically selecting an optimal network based on predefined criteria including signal strength and security protocols;
        retrieving saved Wi-Fi credentials associated with the user's account;

automatically inputting the credentials to connect the user computing device to the selected network; and sending a confirmation message to the user computing device upon successful connection to the Wi-Fi network.

9. The method of claim 8, wherein the network connection settings comprise network roaming instructions.

10. The method of claim 9, wherein the network roaming instructions comprise network disconnect instructions.

11. The method of claim 10, wherein the client instructions further comprise a user opt-out that is based on the network disconnect instructions.

12. The method device of claim 8, wherein the coding instructions comprise network connection settings for the user computing device.

13. The method of claim 8, wherein the network connection settings comprise connection information for a Wi-Fi network.

14. The method of claim 8, wherein the network connection settings comprise connection information for a mesh network.

\* \* \* \* \*